(12) United States Patent  
Shani et al.

(10) Patent No.: US 9,185,885 B2  
(45) Date of Patent: Nov. 17, 2015

(54) DIGITAL ACTIVITY CENTER FOR PETS

(71) Applicant: Forget You Not, LLC, Waban, MA (US)

(72) Inventors: Nissim Shani, Waban, MA (US); Roni Shani, Waban, MA (US); Daniel Shani, Waban, MA (US)

(73) Assignee: Forget You Not, LLC, Waban, MA (US)

( * ) Notice: Subject to any disclaimer, the term of this patent is extended or adjusted under 35 U.S.C. 154(b) by 0 days.

(21) Appl. No.: 14/504,104

(22) Filed: Oct. 1, 2014

(65) Prior Publication Data

US 2015/0109439 A1  Apr. 23, 2015

Related U.S. Application Data

(63) Continuation-in-part of application No. 14/057,894, filed on Oct. 18, 2013.

(51) Int. Cl.
| | |
|---|---|
| *H04N 7/18* | (2006.01) |
| *A01K 1/10* | (2006.01) |
| *A01K 5/00* | (2006.01) |
| *A01K 39/00* | (2006.01) |
| *G06F 17/28* | (2006.01) |
| *A01K 15/02* | (2006.01) |

(52) U.S. Cl.
CPC ............... *A01K 15/021* (2013.01); *A01K 15/02* (2013.01)

(58) Field of Classification Search
CPC .......... G06F 17/28; G06F 17/289; G06B 5/04
USPC ....................................................... 348/143
See application file for complete search history.

(56) References Cited

U.S. PATENT DOCUMENTS

| | | | |
|---|---|---|---|
| 6,407,670 B1 | 6/2002 | Dysarsz et al. | |
| 7,180,424 B2 | 2/2007 | Eyal | |
| 7,460,998 B2 | 12/2008 | Perlo et al. | |
| 8,115,642 B2 | 2/2012 | Thompson et al. | |
| 8,692,676 B2 | 4/2014 | Touchton et al. | |
| 8,704,668 B1 | 4/2014 | Darrell et al. | |
| 2003/0081816 A1* | 5/2003 | Jun et al. ................. | 382/110 |
| 2006/0029912 A1* | 2/2006 | Kearby et al. ........... | 434/116 |
| 2007/0107673 A1 | 5/2007 | Langer et al. | |
| 2007/0113797 A1 | 5/2007 | Mainini et al. | |
| 2008/0163671 A1 | 7/2008 | Dugan | |
| 2008/0272920 A1 | 11/2008 | Brown | |
| 2008/0282988 A1 | 11/2008 | Bloksberg | |
| 2009/0013939 A1 | 1/2009 | Santiago et al. | |
| 2010/0275851 A1 | 11/2010 | Yin | |

(Continued)

OTHER PUBLICATIONS

International Search Report and Written Opinion, PCT/US2014/045782, mailed Nov. 5, 2014.

*Primary Examiner* — Hee-Yong Kim

(74) *Attorney, Agent, or Firm* — Fish & Richardson P.C.

(57) ABSTRACT

In an aspect, a system includes a touch-sensitive surface and a camera mounted to be movable relative to the touch-sensitive surface to acquire an image of an animal interacting with the touch-sensitive surface. The system includes a processor coupled to a memory, the processor and memory configured to cause each of multiple sections of the display screen to be associated with a corresponding activity in which the animal can engage; detect a selection of one of the multiple sections of the touch-sensitive surface; and enable the activity associated with the selected section of the touch-sensitive surface.

30 Claims, 14 Drawing Sheets

(56) References Cited

U.S. PATENT DOCUMENTS

| | | |
|---|---|---|
| 2012/0098536 A1* | 4/2012 | Liedke et al. ............... 324/309 |
| 2012/0262295 A1 | 10/2012 | Roosenboom et al. |
| 2013/0014706 A1 | 1/2013 | Menkes |
| 2013/0092099 A1 | 4/2013 | Hardi et al. |
| 2013/0239904 A1 | 9/2013 | Kim et al. |
| 2014/0020635 A1 | 1/2014 | Sayers et al. |
| 2014/0083364 A1* | 3/2014 | Anderson et al. .......... 119/51.01 |
| 2014/0200877 A1* | 7/2014 | McCann .......................... 704/2 |

* cited by examiner

DIGITAL ACTIVITY CENTER FOR PETS

This patent application is a continuation-in-part application of and claims priority to U.S. patent application Ser. No. 14/057,894, filed Oct. 18, 2014, the contents of which are incorporated here by reference in their entirety.

BACKGROUND

This description relates to assisted animal activities.

Dogs and cats, for example, are capable of a limited amount (compared to humans) of communication with human beings, and with other animals. Dogs and cats can make sounds and engage in motions that are believed to communicate their wishes, needs, reactions, and feelings. In addition, they are believed to be capable of interpreting sounds, fragrances, odors, images, scenes, motions, and other stimuli as communications to them. This limited communication ability can form the basis of strong bonds, among other things. The love of pet owners for their pets and of the pets for their owners is well-known.

Animals are also capable of engaging in a wide variety of activities that could be characterized as training, games and other entertainment, therapy, and others. These activities and others can be facilitated by other animals and human owners, trainers, and handlers.

Electronic devices such as sound systems, televisions, and display monitors attached to computers can be used to play audio and video material that may be considered entertaining for pets.

SUMMARY

In an aspect, a system includes a touch-sensitive surface and a camera mounted to be movable relative to the touch-sensitive surface to acquire an image of an animal interacting with the touch-sensitive surface. The system includes a processor coupled to a memory, the processor and memory configured to cause each of multiple sections of the display screen to be associated with a corresponding activity in which the animal can engage; detect a selection of one of the multiple sections of the touch-sensitive surface; and enable the activity associated with the selected section of the touch-sensitive surface.

Embodiments can include one or more of the following features.

The touch-sensitive surface comprises a display screen.

The system includes a display for displaying content associated with the activity.

The system includes a mount disposed around at least some of the display screen, the camera mounted on the mount.

The activity comprises creating an item of visual art. The processor and memory are configured to enable the animal to interact with the touch-sensitive surface to indicate elements of the visual art being created. The processor and memory are configured to generate the visual art based on a position of the animal on the touch-sensitive surface, a type of touch of the animal on the touch-sensitive surface, a pressure of the animal's touch on the touch-sensitive surface, or a combination of any two or more of them.

The activity comprises creating a work of music. The processor and memory are configured to combine sounds generated by the animal with a previously created audio file.

The activity comprises watching a video or listening to audio.

The activity comprises playing.

The activity comprises training the animal.

The activity comprises an activity directed to a person associated with the animal.

The touch-sensitive surface is sized such that the animal can select one of the multiple sections by walking on the touch-sensitive surface.

The system includes a bottom camera disposed below the touch-sensitive surface.

The processor and memory are configured to send, to a printer, data representative of an image of the animal interacting with the touch-sensitive surface, data representative of an image of an item of visual art created by the animal's interaction with the touch-sensitive surface, or both. The processor and memory are configured to determine, based on the animal's interaction with the touch-sensitive surface, when to send the data to the printer. The determination is made based on an amount of time the animal interacted with the touch-sensitive surface, a degree to which the animal completed the activity, or both. The data comprise information sufficient to print a two-dimensional representation of the animal or the item of visual art or a three-dimensional representation of the animal or the item of visual art.

The processor and memory are configured to send, to a computing device, data representative of an image of the animal interacting with the touch-sensitive surface, data representative of an image of an item of visual art created by the animal's interaction with the touch-sensitive surface, or both. The processor and memory are configured to determine, based on the animal's interaction with the touch-sensitive surface, when to send the data to the computing device.

The processor and memory are configured to monitor a physical characteristic of the animal.

In an aspect, a method includes cause each of multiple sections of a touch-sensitive surface to be associated with a corresponding activity of an animal; detect a selection of one of the multiple sections of the touch-sensitive surface; activate the activity associated with the selected section of the touch-sensitive surface; and acquiring multiple images of the animal interacting with the touch-sensitive surface during the activated activity.

Embodiments can include one or more of the following features.

The method includes displaying content associated with the activity on a display screen associated with the touch-sensitive surface. The touch-sensitive surface comprises the display screen.

Detecting a selection of the one of the multiple sections comprises detecting an interaction of the animal with the touch-sensitive surface.

The method includes sending, to a printer, data representative of an image of the animal interacting with the touch-sensitive screen, data representative of an image of an item of visual art created by the animal during the activated activity, or both. The method includes determining when to send the data to the printer based on the animal's interaction with the touch-sensitive surface. The data comprise information sufficient to print a three-dimensional representation of the animal or the item of visual art.

These and other aspects, features, and implementations, and combinations of any two or more of them, can be expressed as methods, apparatus, systems, components, methods of doing business, program products, and means and steps for performing functions, and in other ways.

These and other aspects, features, and implementations will become apparent from the following description, and from the claims.

DETAILED DESCRIPTION

FIGS. 1 through 15 are block diagrams.

Animal communication can be an important aspect of assisted animal activities.

Figure 1:
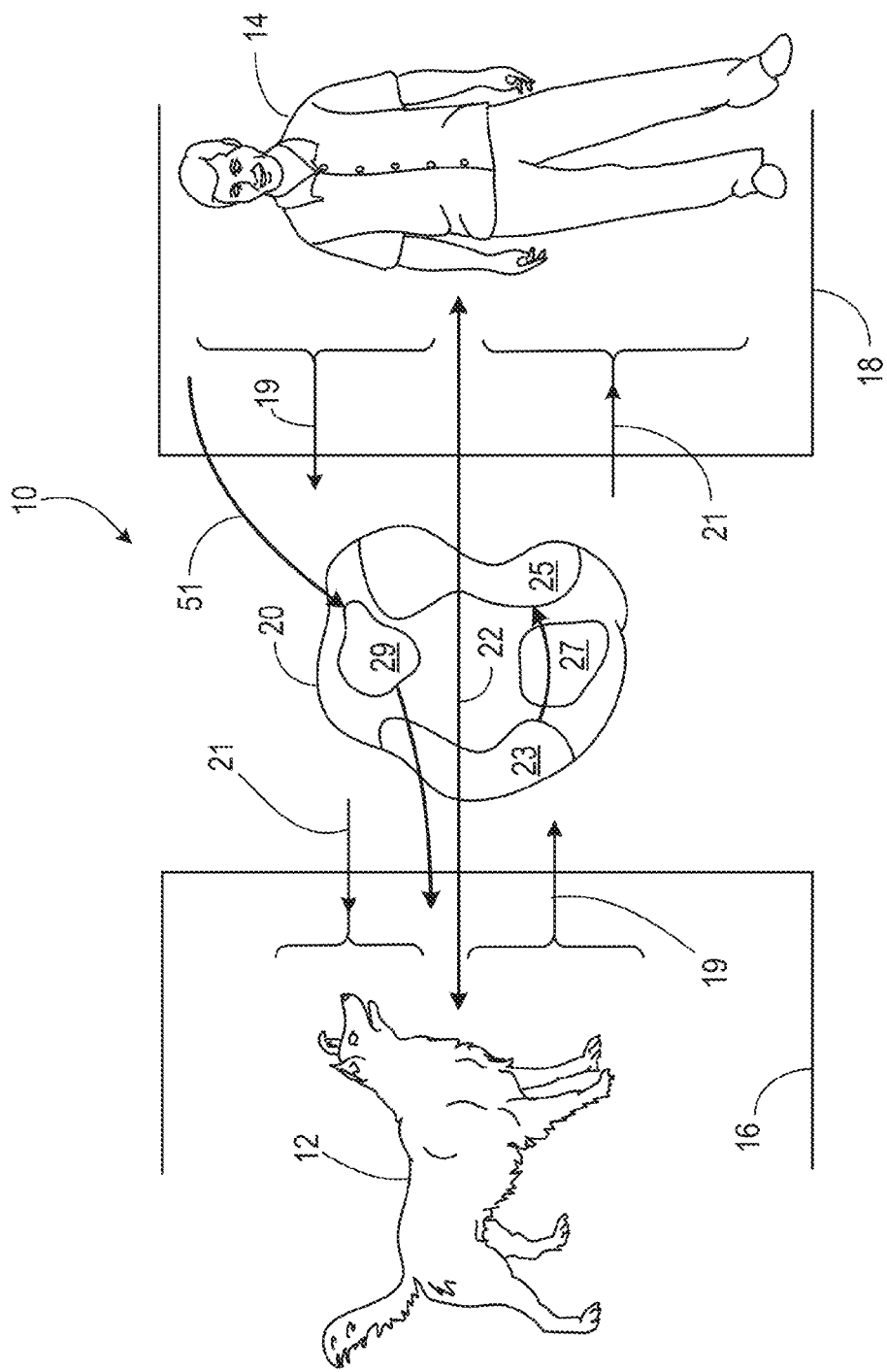
FIG. 1 is a schematic diagram of assisted animal communication.

As shown in FIG. 1, in some implementations of what we describe here, assisted animal communication 10 includes communication between an animal 12 and a human 14, for example, a dog or cat and its owner. The communication that we describe here can be used in connection with training, games, entertainment, therapy, and other kinds of activities to be engaged in by the animals alone, with other animals, or with humans.

In some cases, we describe examples in which the animal and the human are not in the same place or cannot otherwise see or hear each other and therefore cannot communicate directly, for example, when the dog is at home 16 and the owner is at work 18. We describe examples of technology-based systems and techniques (together, technology) 20 that assist the dog to communicate with the owner and vice versa 22 in such circumstances. The technology that we describe here, however, can be useful to assist communication also when the animal and human are located in the same place or can see or hear each other directly.

We use the term animal broadly to include, for example, non-human animals of any kind that are capable of some degree of communication, including primates, dogs, cats, other mammals, and pets, to name a few. We use the term communication broadly to include, for example, any conveying or comprehension of information, emotions, thoughts, or actions between a human and an animal by any mechanism, device, or capability (which we will sometimes refer to as artifacts of communication) including any respect in which the human or animal can move, act, behave, make noise, or otherwise affect its environment (we sometimes refer to these as produced artifacts of communication 19) and any respect in which the human or animal can hear, see, taste, smell, touch, or otherwise sense its environment (we sometimes refer to these as sensed artifacts of communication 21). Produced artifacts and sensed artifacts can relate to voice, sound, image, motion, activity, fragrance, odor, stimuli, and others, and combinations of them. We use the term assisted broadly to include, for example, any device or method that aids, supplements, processes, accelerates, and in any other way helps or enhances the conveying of information, emotions, thoughts, or actions between a human and an animal. We use the term technology broadly to include, for example, any mechanical, electrical, computer, network, wireless, and other devices and techniques, or combinations of them.

We use the term artifacts of communication broadly to include, for example, any sound, noise, image, motion, odor, fragrance, vibration, action, or other activity, stimulus, or event of any kind, to name a few, that is part of, represents, or could be interpreted or understood with respect to a communication.

We use the term activities in its broadest possible sense to include, for example, anything that is done by an animal or human or happens as a result of anything that is done by an animal or human.

Communication between an animal (say, a dog Fluffy) and a human (say, Fluffy's owner, George) generally requires that the communication by Fluffy or George be expressed as produced artifacts that represent the communication (Fluffy barks in a certain way, or George snaps his fingers in a certain way), that sensed artifacts that correspond to the produced artifacts be received (George hears the barking, or Fluffy hears and sees the finger snapping), and that the recipient of the communication be able to understand the communication in a way that the source of the communication intended (George understands that Fluffy wants to go outside, or Fluffy understands that George wants Fluffy to come to him).

The source of the communication can vary the characteristics of produced artifacts of the communication (such as the volume, duration, frequency, pitch, and style of Fluffy's barking) to impart meaning that, by experience, seems to be understood by the recipient (Fluffy has learned that a certain kind of barking will communicate to George that Fluffy wants to go outside). In some cases, the produced artifacts can be interpreted using speech recognition or recognition of sounds made by animals. The recipient of the communication can interpret the characteristics of the received artifacts as indicating the nature of the communication (George has learned, by experience, that a certain kind of barking by Fluffy means she wants to go outside). Thus there is a process by which the sender of the communication learns to formulate the artifacts to represent the communication so that it will be understood effectively and the recipient learns to interpret the correct meaning of the communication represented by the artifacts.

In direct communication between an animal and a human, for example, a pet and its owner, the ability to formulate the produced artifacts effectively and the ability to correctly interpret the sensed artifacts develops over time, sometimes subconsciously and sometimes through training, for example.

The technology that we describe here can assist animal communication in a wide variety of ways. In some implementations, the technology assists animal communication by providing a store-and-forward function for produced artifacts. The technology can include devices 23, 25 that receive, sense, or capture the produced artifacts of communication from the sender and reproduce and deliver versions of the artifacts to the recipient for whom they become sensed artifacts. For example a microphone (one of the devices 23) at the place where Fluffy is located can pick up her barking. In a simple example, the barking can then be delivered through a speaker (one of the devices 25) at the place where George is located (even at the same place where Fluffy is located, in some examples). In some cases, the received artifacts can be passed through artifact processing devices 27 and the process artifacts can then be delivered to the recipient by devices 25. Artifact processing devices 27 can include any kind of device that is capable of receiving, storing, analyzing, altering, enhancing, processing, and sending information about artifacts. In some instances, artifacts can be retransmitted through a network to pass them to the recipient located at a different location than the sender. In some cases, artifacts can be stored temporarily or for an extended period of time and then retransmitted to the recipient. For example, video and text derived from or related to the video or a picture and a message derived from or related to the picture can be delivered to a recipient, either the human or the animal.

For example, Fluffy's barking at 8 AM at his home in Marblehead, Mass., can be recorded, processed to enhance the quality of the recording, and then stored. Later, when George wakes up at 8 AM on his business trip to Palo Alto, Calif., the technology can deliver the sound to George's cell phone at his hotel room.

Figure 2:
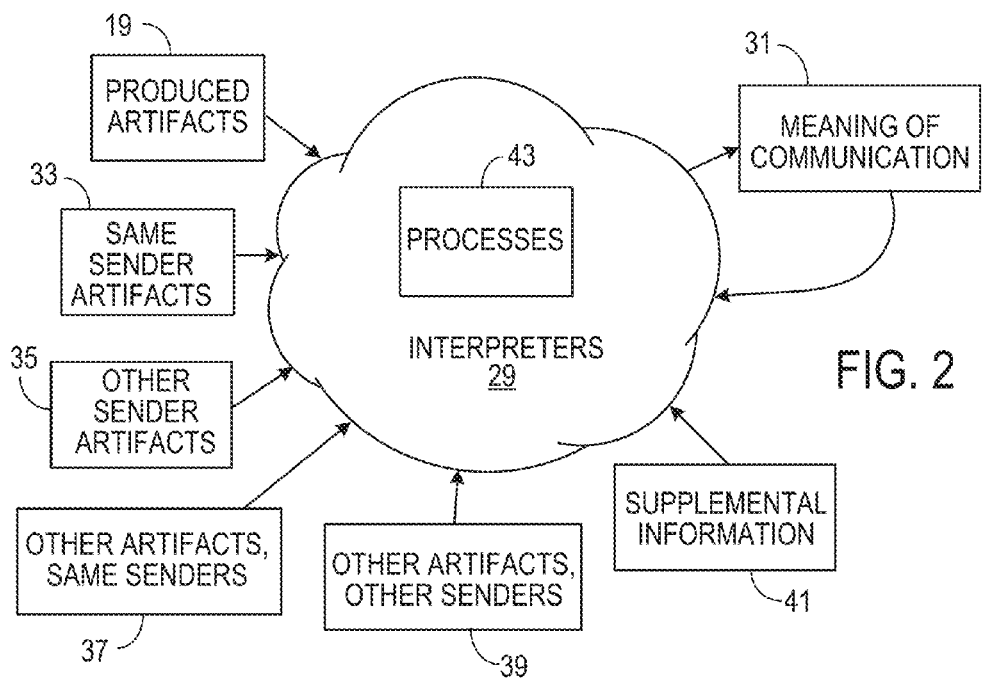
FIG. 2 is a block diagram of the operation of an interpreter.

In some examples, as shown in FIG. 2, the artifact processing devices 27 can include interpreters 29 that convert, interpret, translate, or otherwise derive the meaning of the communication 31 represented by received artifacts, based on information available to the processing devices. The information available to the processing devices can include the produced artifacts 19, previously produced artifacts of the same sender 33 (for example recordings of Fluffy barking when she wanted to go outside), previously produced artifacts of other senders 35 (for example, recordings of other dogs barking when they want to go outside, or videos of a large number of dogs engaging in various kinds of behavior, such as barking, pacing, and running), other produced artifacts of the same sender 37 (for example, videos of Fluffy tapping her paw against the door when she wants to go outside), other produced artifacts of other senders 39 (for example, videos of other dogs tapping their paws against doors when they want to go outside), supplemental information 41 provided by human beings about the behavior of the sender (for example, information provided by George that Fluffy barks and taps her paws against the door when she wants to go outside, and that she typically wants to go outdoors between 1 PM and 3 PM every afternoon), data about the context of the produced artifacts 19 such as the time when Fluffy was barking, how recently she was barking on the previous occasion, where Fluffy is located at the moment, and a wide variety of other information.

Users of the technology 20 (for example owners of pets) can provide some of the supplemental information 41 through interface features of client devices to define, explain, illustrate, or otherwise capture relationships between artifacts of communication and interpretations of the artifacts and between communications and artifacts that can be used to articulate them. For example, George could take videos of Fluffy pacing back and forth at times when Fluffy needs to be walked, submit the videos, and add the information that the videos represent Fluffy needing to be walked. In that case, the artifacts could be the pacing back and forth, the speed of pacing, the duration of pacing, the extent of pacing, and other characteristics, which can be reflected directly in the video or explicitly identified by text entry by the user. The corresponding interpreted communication would be that Fluffy needs to be walked. In some cases, George could add video and a voice overlay to the video indicating the meaning of what is shown in the video.

Later, during operation of the technology 20, when Fluffy is captured in a video pacing back and forth, the interpreter can use the previously entered video and other information as the basis for interpreting the pacing as indicating that Fluffy needs to be walked, if the current pacing is found to match to some degree the previously provided pacing videos. To perform the analysis, the interpreter can use a variety of mathematical and statistical techniques and models. A wide variety of other kinds of information can be provided by a user such as information about the animal (size, age, species, favorite foods, and behavior, to name a few), information about the human, information about the environment in which the animal or the human is doing the communicating, and others. The supplemental information can include information about a class of animals to which the animal belongs, habits of that class of animals, behavioral patterns, and many others.

The technology 20 can generate its own information useful in later interpretation, for example, by storing information acquired through client devices and interface features during the operation of the technology, and by storing its analysis and interpretations of that information. For example, the technology 30 could acquire and store videos, images, audio recordings, text, and other information obtained from animals and humans, could associate artifacts of communication that occurred in those stored items with interpretations of the communications based on explicit confirmations provided by the humans based on inference, and could store artifacts that were used to correctly articulate communications, and combinations of those activities. The technology 20 can also embed the voice of the owner, or a picture of the owner and the voice of the owner that reflect interpretations of the content of the artifacts of communication The interpreters 29 can include processes 43 that use the available information to derive the meaning of the communication 31. The processes can include algorithms, inference engines, models, and a wide variety of other mathematical, logical, and other processes, and combinations of them.

Once the meaning of the communication 31, represented by received artifacts, has been derived or determined by the interpreters 29, the meaning can be used in a wide variety of ways.

In some cases, the meaning can be conveyed to the recipient of the communication in a form different from the received artifacts. For example, if the interpreter determines that the meaning of certain behavior by Fluffy is that Fluffy wants to go outside, a text message or e-mail or alarm sound can be sent in text or some other form to a desktop computer at George's office to tell him that Fluffy wants to go outside. In some implementations, the meaning can be conveyed to the recipient at the same time as the artifacts (by playing back Fluffy's barking at the same time that the message is displayed to George, for example).

In some instances, the meaning of the communication can be saved in association with the artifacts that relate to the meaning. The association between the meaning and the artifact can then be used by the interpreters 29 to improve the quality and speed of their interpretation of the meaning of other artifacts received from a sender.

In some implementations, the meaning of the communication can be used for a wide variety of purposes other than the direct delivery of the meaning to the recipient. For example, suppose that the meaning of a certain kind of barking done by Fluffy is that Fluffy wants to be fed a CrunchyLunch biscuit. The relationship of that meaning to the certain kind of barking might be aided by information provided by the manufacturer of CrunchyLunch biscuits based on prior associations with certain kinds of dog barking and its product. In addition, the manufacturer could make an arrangement to pay the host of the technology, each time the meaning of the communication has been determined as "feed me a CrunchyLunch biscuit", to send a message to George saying "Fluffy wants to be fed a CrunchyLunch biscuit". Or the manufacturer could pay the host of the technology to send an online coupon to buy CrunchyLunch biscuits for one dollar off the normal price of a box.

Figure 3:
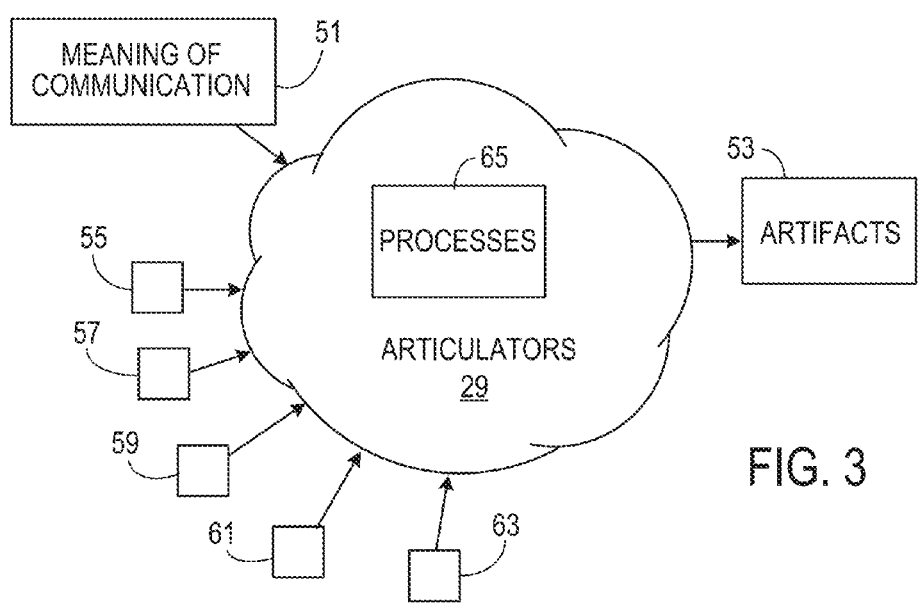
FIG. 3 is a block diagram of the operation of an articulator.
Figure 4:
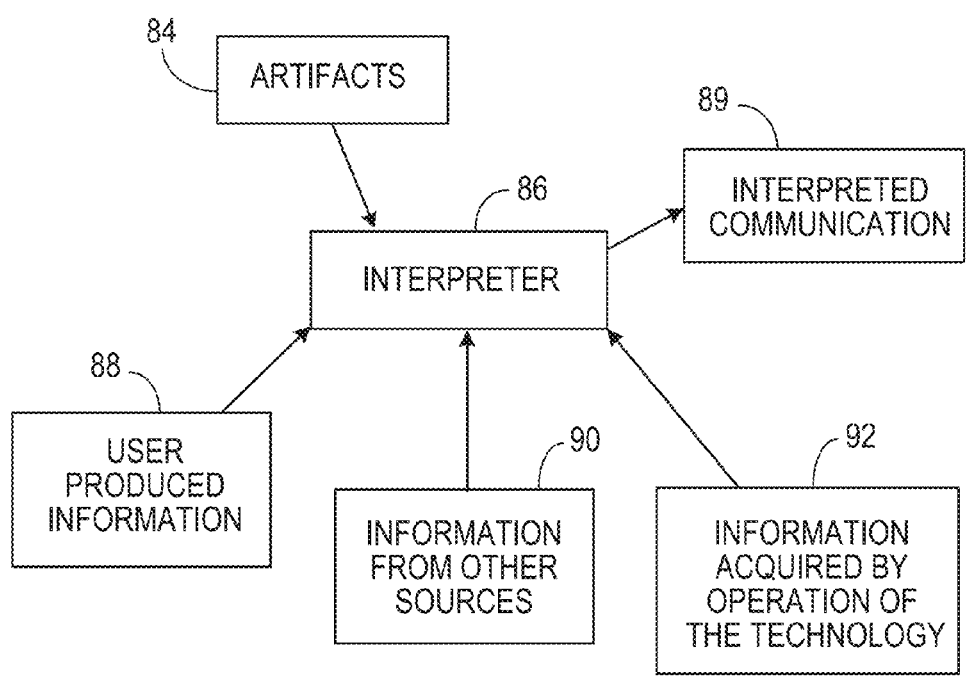
FIG. 4 is a block diagram of the operation of an interpreter.

Some of the discussion above has described how artifacts can be interpreted as the meanings of communications from the source of the artifacts to a recipient. Conversely, as shown in FIG. 3, the technology can receive information about the meanings of communications 51 and select artifacts 53 that will express the communications to the intended recipients. For convenience, we call the part of the technology that performs this function "articulation devices" (or simply, articulators) 29 to capture the idea that the meaning is being articulated in artifacts so as to be understandable by the recipient. The articulators can use a wide variety of information, in addition to the meanings of communication, in determining which artifacts 53 to select. The additional information can include, for example, similar meanings of other communications of the same sender and related artifacts 55, similar meanings of other communications of other senders 57 and related artifacts, other meanings of other communications of the senders 59 and related artifacts, other meanings of other communications of other senders 61 and related artifacts, and supplemental information 63 provided by human beings.

For example, the supplemental information 63 could provide information that associates the meanings of communications with artifacts that could be useful in articulating those meanings. George could provide data to the technology explaining that when he wants to send a communication the meaning of which is "the door is open, you can now go outside", he believes that Fluffy will be most responsive if the artifacts used to express that meaning include a certain video of him snapping his fingers. The artifacts can then be embodied in a video of George, recorded on his mobile phone, to be sent to Fluffy.

Conversely, artifacts derived from activities of Fluffy could be associated with meanings and the meanings could be articulated in the form of videos of Fluffy along with messages from Fluffy to George that articulate the meaning. For example, certain artifacts of Fluffy's behavior may be interpreted by the technology as representing Fluffy attempting to communicate with George the message "I miss you. Won't you come home?" The technology could associate the artifacts with that communication. The communication can then be articulated in the form of a pre-recorded video of Fluffy that George would recognize as conveying the message, together with a caption on the video that says "I miss you want to come home?" The video message can then be sent to George on his mobile phone.

For the purpose of selecting the artifacts that should be used to convey a particular meaning of the communication, the articulators 29 can include processes 65 that use the available information to infer, derive, or determine the appropriate artifacts. The processes can include algorithms, inference engines, models, and a wide variety of other mathematical, logical, and other processes, and combinations of them.

For example, suppose that George has just awoken in the bedroom of his house and Fluffy is in the kitchen wanting to go outside through the dog door next to the slider that opens onto the deck. Suppose the dog door has an electronic switch that unlocks the door and a light that can be illuminated to tell Fluffy the door is now open and he can go outside. George hears Fluffy barking. George picks up his cell phone, and launches the app provided by the technology, taps the option indicating that he wants to communicate to Fluffy by unlocking the dog door and turning on the light. The articulators, in this simple example, determine the meaning of the communication from George and then they select the best artifacts to articulate or express this communication to Fluffy. In this case, the technology sends the commands of the electronic switch on the dog door, to open the switch, and after the switch is open, turns on the light to tell Fluffy that the dog door is open.

In another example, suppose that the meaning of the communication is "try to interest Fluffy in asking for and eating a CrunchyLunch biscuit," a communication that may have been received from the manufacturer of CrunchyLunch biscuits. The articulators consider the time of day, the room where Fluffy is located, information about whether Fluffy has eaten recently, and historical information about the susceptibility of Fluffy to the communication in that context. The articulators decide that the best way to motivate Fluffy is to show Fluffy a picture of a box of CrunchyLunch biscuits on a monitor in the living room where Fluffy is located, and to play the CrunchyLunch jingle on George's sound system in the living room. In addition, non-custom movies of the kind that are sometimes shown to pets could include advertising illustrating CrunchyLunch biscuits, playing the CrunchyLunch jingle, and in that way motivating Fluffy to become interested in eating CrunchyLunch biscuits.

A wide variety of games could be played with animals using the technology and with or without a human being present at the location where the game is being played. For example, a command (that can be set to be triggered at a particular time or after a series of other events or presentation of digital content) can indicate to the animal that the animal is to find a treat or toy that had been previously hidden by the owner somewhere near the television (or other source of artifacts) or at any location in the house. The repetition of this command (and "game") will train the animal to search for the treat or toy and return to the TV. The ability of the technology through cameras or other sensors to recognize when the animal has found the treat or toy (using, for example, image recognition) can trigger the capture and delivery of an image of the dog to the owner and a message congratulating the animal on the accomplishment ("good dog, good dog").

As suggested in this example, the technology could be used in a wide variety of ways to train animals remotely.

Figure 5:
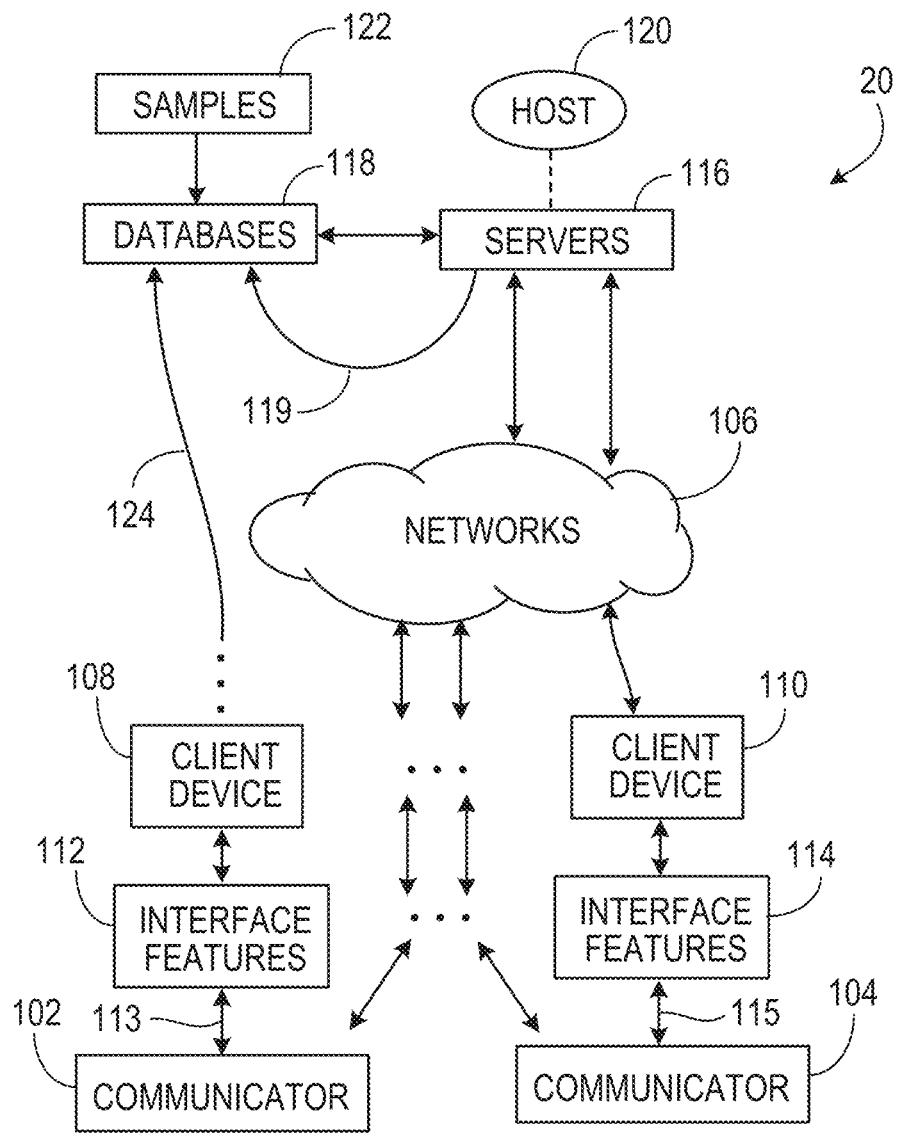
FIG. 5 is a block diagram of an example implementation of technology for assisted animal communication.

As shown in FIG. 5, the technology 20 can be implemented in devices and networks that assist communications between two or more communicators 100, 102 located anywhere in the world (for example, Fluffy and George). In some implementations, the technology 20 can be organized in a client-server model in which a host party 120 operates servers 116 that communicate through networks 106 with client devices 108, 110. The networks can be any kind of local or wide area networks, public networks, dial-up telephone networks, wireless or wired networks, cellular telephone networks, the Internet, Wi-Fi, or any other kind of communication network that can carry information related to assisting animal communication.

The client devices 108, 110, can internally include or externally support (or both) interface features 112, 114 (for example, the devices 23, 25 of FIG. 1) that enable interactions 113, 115, with animals and humans or other communicators 102, 104. Each of the client devices can be associated with one or more than one of the interface features. The interactions 113, 115 (for example the artifacts 19, 21 of FIG. 1) can include a wide range of interactions such as artifacts of communication produced by one of the communicators and sensed, detected, or received through the interface features; a wide range of noises, sounds, images, video, odors, tactile sensations, flavors, and other stimuli that serve as artifacts of communication to be received and used by one of the communicators; and information provided by the communicators through user interfaces that are part of the interface features. With respect to the latter, for example, a communicator (a human or an animal) may be able to enter text, have speech recognized, have gestures recognized, touch user interface elements, and in a wide variety of other ways, to enter information through the interface features into the client devices. The entered information may relate to communications between two communicators or can relate to the setting up, management, and operation of the technology (for example, a user creating a user account with the technology).

In some cases, the servers 116 interact with the client devices to aid communications between communicators by having the servers send and receive information associated with the communications to and from the client devices. The client devices in turn aid communications between communicators by sending and receiving information to and from the interface features.

Various kinds of processing of the information can then need to occur within the technology 20. The processing can be divided in a wide variety of ways between the servers, the client devices, and the interface features. In some cases, the client devices may do very little other than pass information back and forth, while most of the processing effort is performed at the servers. In other cases, most of the processing could be done in the client devices with the servers simply passing processed information back and forth through the networks to and from the client devices. Other arrangements would also be possible.

The servers can be associated with databases 118 that contain a wide variety of information concerning the animals, the humans, the client devices, the interface features, behavioral information about animals and humans, information about communications, user files, account information, and others. The information for the databases can be provided 124 from the communicators in the form of any sort of artifacts of communications or information associated with communications or with users of the technology. Information for the databases can also be provided 119 from the servers based on processing of information that flows through the technology (for example, interpreted communications that are based on received artifacts can be stored for future use). Information can also be provided from external sources 122. For example, information about the behavior, actions, history, interests, and communications of specific animals or humans or of animals or humans in general or with respect to groups, types, species, or categories of them, to name a few, can be provided.

A broad range of software, firmware, hardware, or combinations of them, could serve as the client devices. The client devices could be, for example, any kind of device that is capable of providing or controlling or using the interactive features to conduct any of the interactions with any of the communicators and capable either directly or indirectly of communicating information with the servers.

The client devices can include, for example, computers, laptops, pad computers, mobile devices, mobile telephones, telephones, televisions, music systems, appropriately wired refrigerators, storage containers, doors or gates, pet houses, houses, automobiles, boats, kennels, and veterinary facilities to name a few.

The interface features can be provided through elements that are part of the client devices or by interface elements that are connected to, driven by, or controlled by the client devices. The interface features can include, for example, loud speakers, headphones, or other sound producing features, microphones or other sound detectors, GPS features, vibrational or other tactile features, displays, screens, projectors, or other image or video displaying features, fragrance generators, odor generators, fragrance detectors, odor detectors, cameras, video cameras, image detectors, and other audiovisual features, switches, latches, locks, lights, fans and other wind creating devices, sunscreens, shades, and a wide variety of other input and output elements that can provide or receive stimuli, information, and other artifacts of communication to and from the animals or humans.

In some instances, the interface features could be represented by an Internet browser running on a computer or handheld device or by a user interface provided by an app on a mobile phone or other handheld device.

Over a period of time, during the course of the operation and use of the technology, a wide variety of information including communications, messages, artifacts, events, behavior, and other aspects of the lives of animals and humans will be captured and stored. This information and parts of it can be used for a wide variety of purposes. For example, once a year, say on an anniversary of the first time George and Fluffy met, or on George's birthday, or Fluffy's birthday, or at other intervals or on other occasions, the technology could automatically (or upon request by George or Fluffy) aggregate from the stored information an album or a video or a greeting card or another kind of multimedia presentation to be played to George or Fluffy.

Unlike other facilities that may present non-custom sounds, audio, video, or images to a large number of different pets to entertain them, the technology can be used to present highly customized and therefore much more interesting presentations to humans and animals. For example, George could select the video of himself from the technology, add a selected picture of himself, and add selected icons or symbols that Fluffy would understand, and have an aggregated presentation using those content elements delivered to Fluffy at any time of the day or night on any day of the year. George could also create a multimedia presentation made up of artifacts received from Fluffy and other elements for presentation to himself or to others.

In some cases, the communications 22 between humans and animals that are assisted by the technology 20 can be simple and direct and require no interpretation. For example, Fluffy's barking in a certain way can be a produced artifact 19 of a communication that would be clearly understood by George without assistance or interpretation by the technology. In such a case, the interface features and client devices need only detect the artifact of Fluffy's communication and pass it through the networks to the server, which can then pass it back through the networks to other interface features and client devices associated with George. For example, a camera on a laptop computer in George's living room can capture video of Fluffy barking and the video can be passed to the server and then from the server to George's mobile phone. George may be able to understand what Fluffy is trying to communicate simply by watching the barking.

In some cases, the artifacts 19 of a communication that a human or animal is trying to provide to the other may require interpretation by the interpreters 29 before the content of the communication can be conveyed to the other. For example, the way in which Fluffy paces back and forth at a given time of the day may indicate that Fluffy needs to be walked. A video that captures Fluffy pacing could then be interpreted by the processes 43 as meaning that Fluffy needs to be walked. The interpreted communication 31 could then be provided to George through another client device.

Thus, the technology 20 can assist communication between a human and animal by (1) providing a simple conduit for passing, storing, and delivering artifacts of communication from one to the other, (2) interpreting artifacts of communication produced by one of them and passing, storing, and delivering the interpreted communication to the other, (3) receiving a communication from one of them and articulating artifacts that represent the communication, and delivering the artifacts to the other, or (4) any combination of two or more of those.

The interpretation of artifacts as a communication, the articulation of artifacts based on a communication, or a combination of them, can be done by a wide variety of hardware, firmware, or software running on a wide variety of devices of the technology 20. In some implementations, the artifacts or communications are passed to the server and the interpretation and articulation are done at the server. In some implementations, the artifacts are interpreted or the communications articulated at the client devices and the interpreted communications or the articulated artifacts are passed to the server. In some cases, some of the processing can be done at client devices and some of the processing can be done at the server.

The databases associated with the server (and similar databases or portions of them associated with the client devices) can store a wide variety of different kinds of information useful in the operation of the technology 20. For example, users of the technology can register account information about themselves and about animals, such as their pets. The information can be updated from time to time and stored in user accounts.

A wide variety of information can be registered with the technology. For example, George could identify on an online mapping system, such as Google maps, the locations of all of the playgrounds that are nearby George's house and to which Fluffy enjoys going to visit with his dog buddies. Other dog owners could do the same with respect to their dogs. When one of the owners decides to take her dog to one of the playgrounds, she could note that fact on the technology and that information could be provided to the other owners (for example through a social networking site or by e-mail or by text message), and in some respects to the dogs, that are in the neighborhood of that playground. For example, the technology could tell George that Muffy, a dog buddy of Fluffy, will be at the Lincoln playground at the corner of Main and Willoughby at three o'clock in the afternoon. This message could be sent to George on his mobile phone at the office. George could then reply with a message to cause the technology to tell his daughter, who is at home, to take Fluffy to the Lincoln playground to visit with Muffy at 3 PM. In addition, or alternatively, the technology could cause an artifact to be played on the sound system in George's house to attract Fluffy to watch the TV monitor. Then a picture of Muffy romping at the Lincoln playground, and previously captured, could be displayed to Fluffy. Fluffy could then step on a switch to indicate that she wants to go to the Lincoln playground to play with Muffy. This artifact would trigger an alert to George's daughter, who could then take Fluffy to the Lincoln playground.

In another example, a dog or cat could be attracted to a location to initiate interaction by using any kind of device or mechanism that can provide an artifact that is attractive to the animal. The artifact could be an odor as animals are often highly sensitive to odors and attracted by them. A device or mechanism capable of emitting an odor in response to a command could be provided. (See for example the discussion at http://en.wikipedia.org/wiki/Digital_scent_technology.) By coordinating the emitting of the odor with, for example, the beginning of a video presentation, the animal could be attracted to watch the video presentation. In some instances, the device or mechanism could be one that provides vibrations or other tactile artifacts in response to a command. Animals are often sensitive to and attracted by sounds and physical sensations. The initiation of the associated video (or any other artifact or communication to be presented to the animal) could be delayed until a sensor determines that the animal is in the vicinity of the television or other device that is presenting the artifacts. That is, the sequence could be first to command the release of the odor or vibration, next to monitor for the presence of the animal, and finally to initiate the presentation of the artifacts.

For a given animal and for multiple animals, the databases can store information about and examples of behavior, size, age, species, ownership, location, favorite foods, relationships and friendships among different animals, and associations of animals with humans, among other things.

The databases can include information about communications and artifacts of communication associated with individual animals or groups of animals and individual humans or groups of humans. The artifacts can be associated in the database with interpreted communications that relate to the artifacts. Conversely, the database can store communications that might occur or that the user might wish to occur and could associate those communications with artifacts that can be used to convey them.

For example, a standard communication that George might want to convey to Fluffy would be "You may now go out of the house by stepping on the switch that opens the gate at the front door." The related artifact might be turning on a signal light on the gate. The database could store the communication and associate it with an action to be performed by a client device, namely turning on the light. During operation, George might choose, through an interface on a telephone, an entry that said "Fluffy, it's okay to go out of the house." When that selection is received by the server, the server could use the database to associate it with the action of turning on the light. The server would then send an instruction to a client device at the house causing the light to be turned on.

Conversely, Fluffy may miss George and want to see live streaming video of George at work. Fluffy could step on the switch three times as an artifact to signal this message. George, at work, could turn on the camera of his mobile phone and allow it to capture video which would then be streamed to the television and George's living room for Fluffy to watch.

The technology 30 can be used in a wide variety of situations to assist humans to communicate with animals. We describe several additional examples below, but these are merely a few examples of thousands of possible cases.

1. A cat owner is at work. The owner has left her cat, Buffy, at home alone for the day. At lunchtime, the cat owner is wondering how Buffy is faring. The cat owner uses an app on her mobile phone to connect to the server of the technology 20. The app displays a user interface screen on which the cat owner can select "Check in on Buffy." The server then sends instructions to a client device in the form of a laptop sitting on the dresser in the room where Buffy is spending the day. The instructions cause the laptop to turn on the camera of the laptop and begin to stream video of Buffy to the server, which then streams it to the owner's phone. The video shows that Buffy is running around in a circle licking her lips. At the same time, based on previously recorded videos of Buffy and information previously entered by the owner about the meaning of those recorded videos, the interpreter at the server determines that Buffy is hungry. The server causes the owner's mobile phone to display a message underneath the streaming video that says "Buffy is hungry." This is the interpreted message from the artifact of Buffy running around in a circle and licking her lips. The message confirms to the owner the owner's guess that Buffy is hungry based on watching the streaming video. Next, the server can send an instruction to the owner's mobile telephone to cause it to provide a dialogue that asks "Do you want Buffy to be fed?" If the owner's replies that she does, that communication is articulated at the server, using the database, into artifacts to be executed to enable Buffy to be fed. For example, the server can send a video back to the laptop to be displayed to Buffy that displays a symbol or a video of the owner or some other artifact that Buffy has come to know as the signal that she can feed herself from a storage container in the room. In this example, Buffy has been trained or preconditioned to behave in a certain way when certain artifacts are presented to her from client devices. Buffy then goes to the storage container on the floor of the room which has now been conditioned by an electronic switch to be accessible. Buffy opens the storage container and eats the food. The laptop can stream video to the server and the server can stream the video to the owner's mobile phone showing that Buffy is eating.

The technology that we have described can be applied in a wide variety of ways for the benefit of the animals and humans. Some of these applications can be categorized in groups that we will roughly call games, activities, entertainment, training, or teaching.

Figure 6:
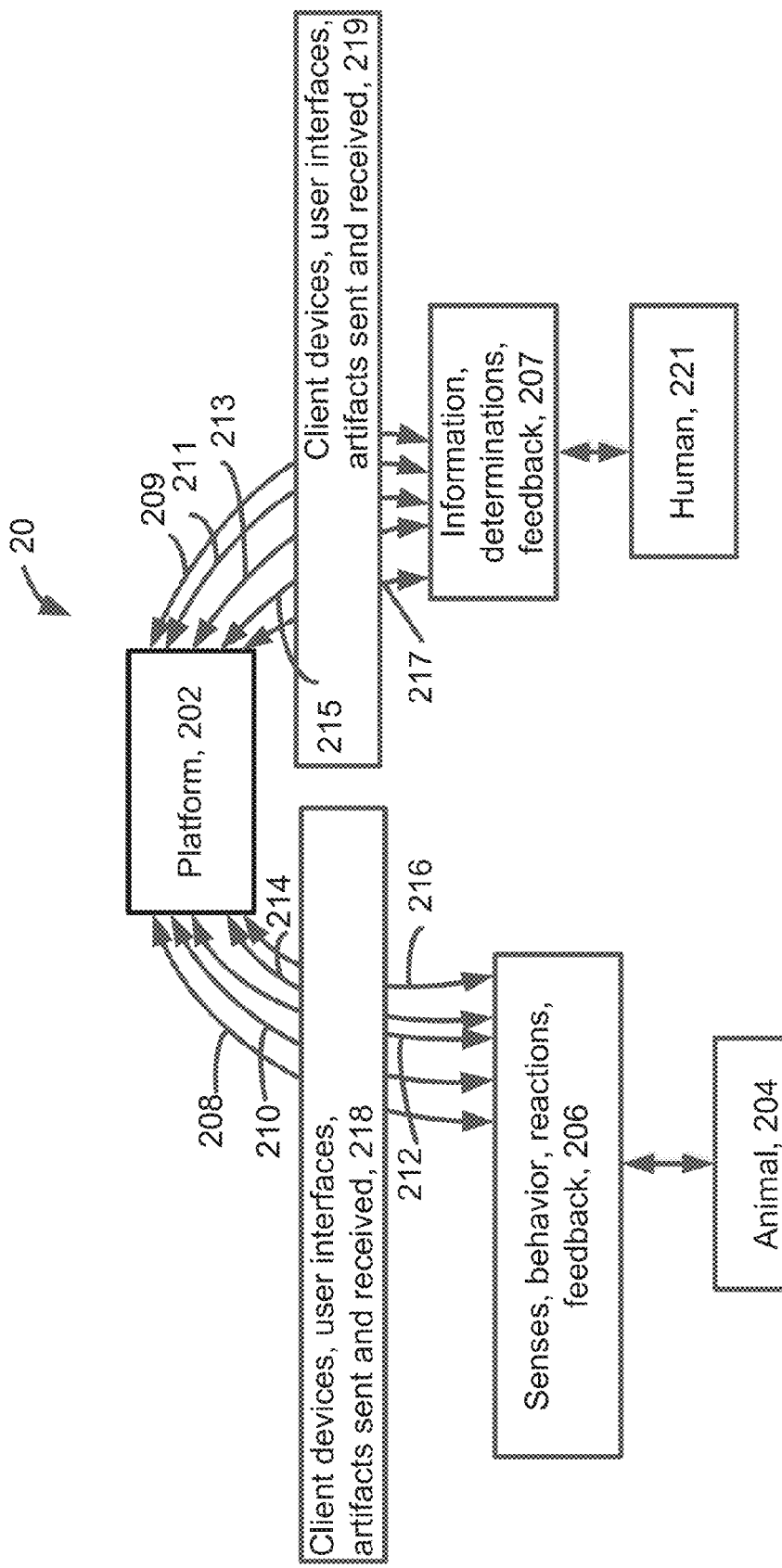
FIG. 6 is a block diagram of an example platform for assisted animal communication.

As shown in FIG. 6, with respect to training or teaching, the technology that we have described (including the technology 20 of the kind discussed earlier) can provide a universal system or platform 202 that enables the teaching of an animal 204 through the animal's senses 206 (vision, hearing, or smell, for example) to enable the animal to learn vocabulary 208, to learn to respond to commands 210, and to learn about "life" 212, among a wide variety of other lessons. In some cases, the animal can be taught sign language 214, and deaf or blind animals can be taught to use other senses.

Figure 7:
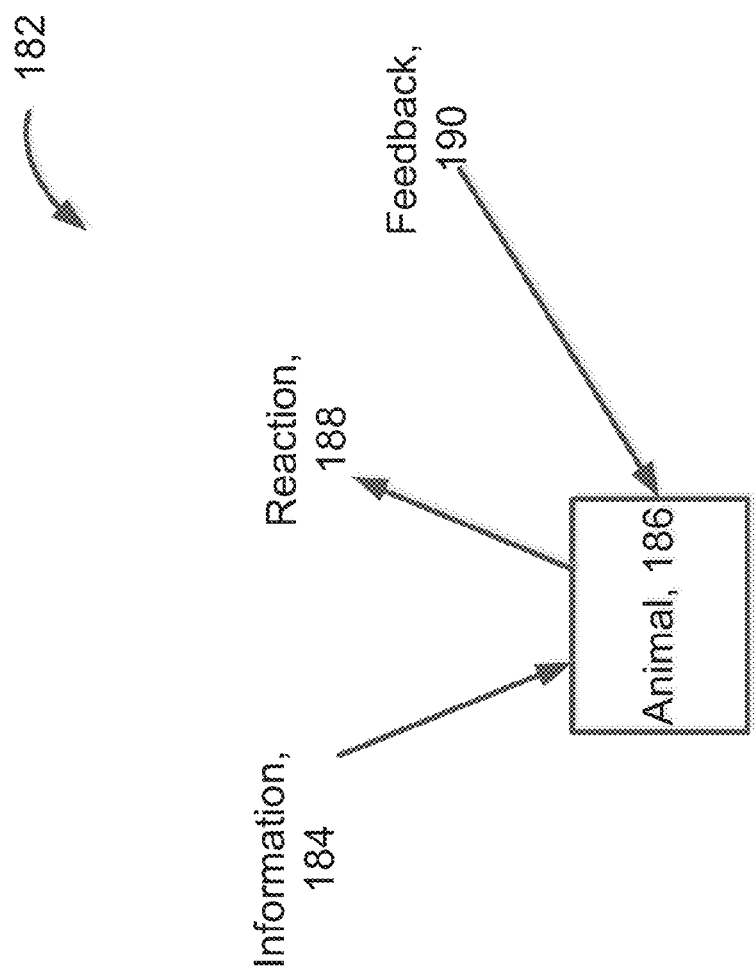
FIG. 7 is a block diagram of an approach to training or teaching an animal.

Referring also to FIG. 7, generally, training or teaching 182 can include presenting information 184 to the animal 186, determining a reaction or behavior 188 of the animal that suggests that what is being trained or taught has been learned or partially learned, and providing feedback (positive or negative) or rewards or punishment (or both) 190 when the determined reaction or behavior meets a threshold. In some implementations, the presentation of the information in the course of providing feedback to the animal, including rewards or punishment, is done using artifacts presented through interface features of client devices 218. In some implementations, the determining of the reaction or behavior the animal is done by sending and receiving artifacts from the animal through interface features of client devices 218.

For example, in the case of teaching an animal a word or phrase in a vocabulary, the word or phrase can be presented to the animal in the form of speech of an owner or handler or other human who is associated with the animal, or speech of a human who is not associated with the animal. The speech can be presented through an audio or video device, including a microphone, a television, or a display screen of a computing device, for example, or a wide variety of other devices 218. The speech may have been pre-recorded or may be delivered in real-time from a remote location where the human is located. In some cases, the word or phrase can be presented in other than speech form, for example, in writing, or using a token or icon or other graphical representation. The non-speech presentation could occur on a display, a light matrix, or any of a variety of other text and icon presentation devices.

The process of determining the reaction or behavior of the animal in response to the presentation of the information includes collecting information through the client devices about the behavior or actions 207 of the animal. The behavior and actions can include motions, fragrances, noises, and bodily fluids, for example, in a wide variety of other artifacts. These can be detected using cameras, microphones, fragrance detectors, and substance detectors as part of the client devices. Once the information is collected, the platform can analyze it using sophisticated mathematical techniques including classifiers, predictive modeling, statistical analysis, signal processing, and others. The analysis can take advantage of stored information that associates animal behavior and actions with meanings, as discussed earlier.

The feedback presented to the animal can take a variety of forms, for example, sounds, images, video, food, access to play things, lights, access to locations, and a wide variety of other feedback. These kinds of feedback can be provided through client devices 218, for example through latches on gates or doors, boxes that have controllable lids or doors, loudspeakers, light displays, and video display devices, to name a few.

In some cases the platform 202 controls and executes the delivery of the training, which can be done on a predetermined schedule, or at times triggered by behavior of the animal, or at times triggered by a human or another animal. Training can proceed automatically and repetitively under the control of the platform 202. Automatic training can take advantage of recorded audio, video, text, graphics, images, and other kinds of artifacts that are stored on the platform 202. These artifacts can be generated and stored from material provided by a human who is associated with a particular animal, such as an owner of a, or they can be generated using professional speakers, actors, graphic designers, writers, and others in stored for use with several or a large number of animals. Thus, a human 221 can play a role in the training by providing artifacts such as speech, actions, typed input, commands, and images, for example, that represent training information, determinations made by the human about the reactions and behavior of the animal, and feedback 207, and the control of the platform 202 to do any of those things.

The human can also can receive information associated with the training of the animal. For example, the human can receive information indicating that training is proceeding, information about the specific training being given, information about feedback being given to the animal, and information about the success of the training, audio, video, and other artifacts that represent the training (for example, a pet owner can receive video on his cell phone showing his pet being trained to understand the word "ball"). All of this information can be delivered through client devices 219.

The platform 202 can also be used to teach games to an animal, to enable the animal to play the games either alone or with other animals and humans either at the same location or at other locations, or to play a game with one or more animals directly without the involvement of a human.

We use the term games broadly to include, for example, any activity of an animal that involves active participation of the animal and is entertaining to the animal and, in some cases, has a goal or objective that the animal is to achieve. In some cases, the game is one performed alone by the animal. In some cases, the game can involve interaction with one or more humans or with one or more other animals.

Figure 8:
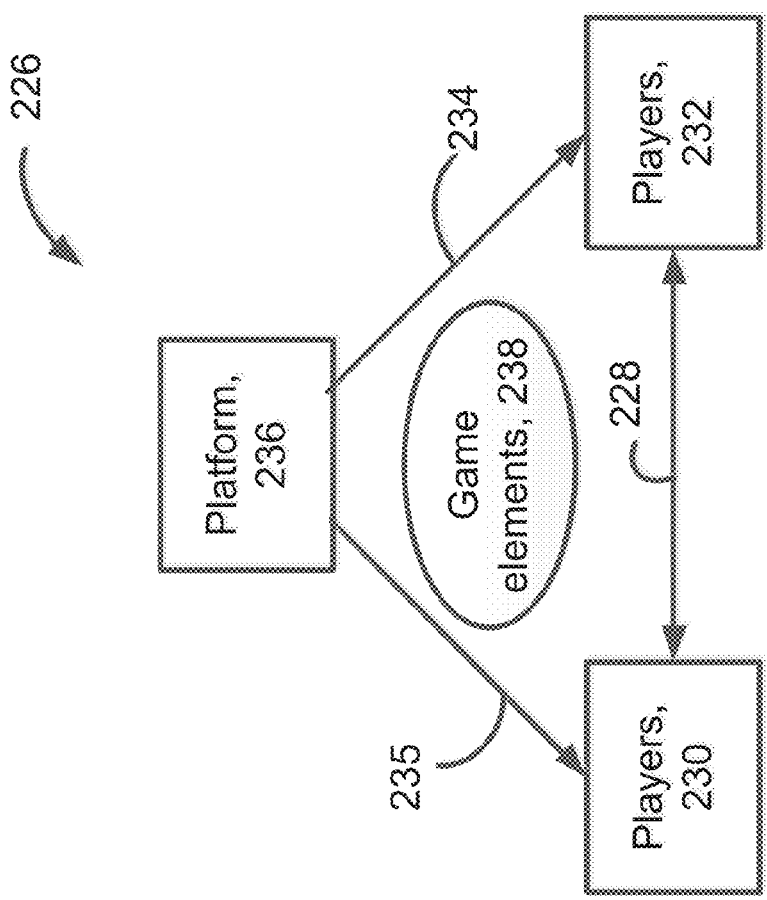
FIG. 8 is a block diagram of a game.

As shown in FIG. 8, games 226 can involve back and forth interaction 228 between and among players 230, 232 (humans and animals), or can involve individual play by an animal, or can involve play or other interaction 234, 235 between the platform 236 and one or more players, or can involve all of these. In some cases games are played without any external artifacts or devices, for example, a simple game in which a dog runs successfully to four corners of a playing field. In some cases games involve game elements 238 such as balls, courts, tokens, bones, water, and a wide variety of other elements.

Figure 9:
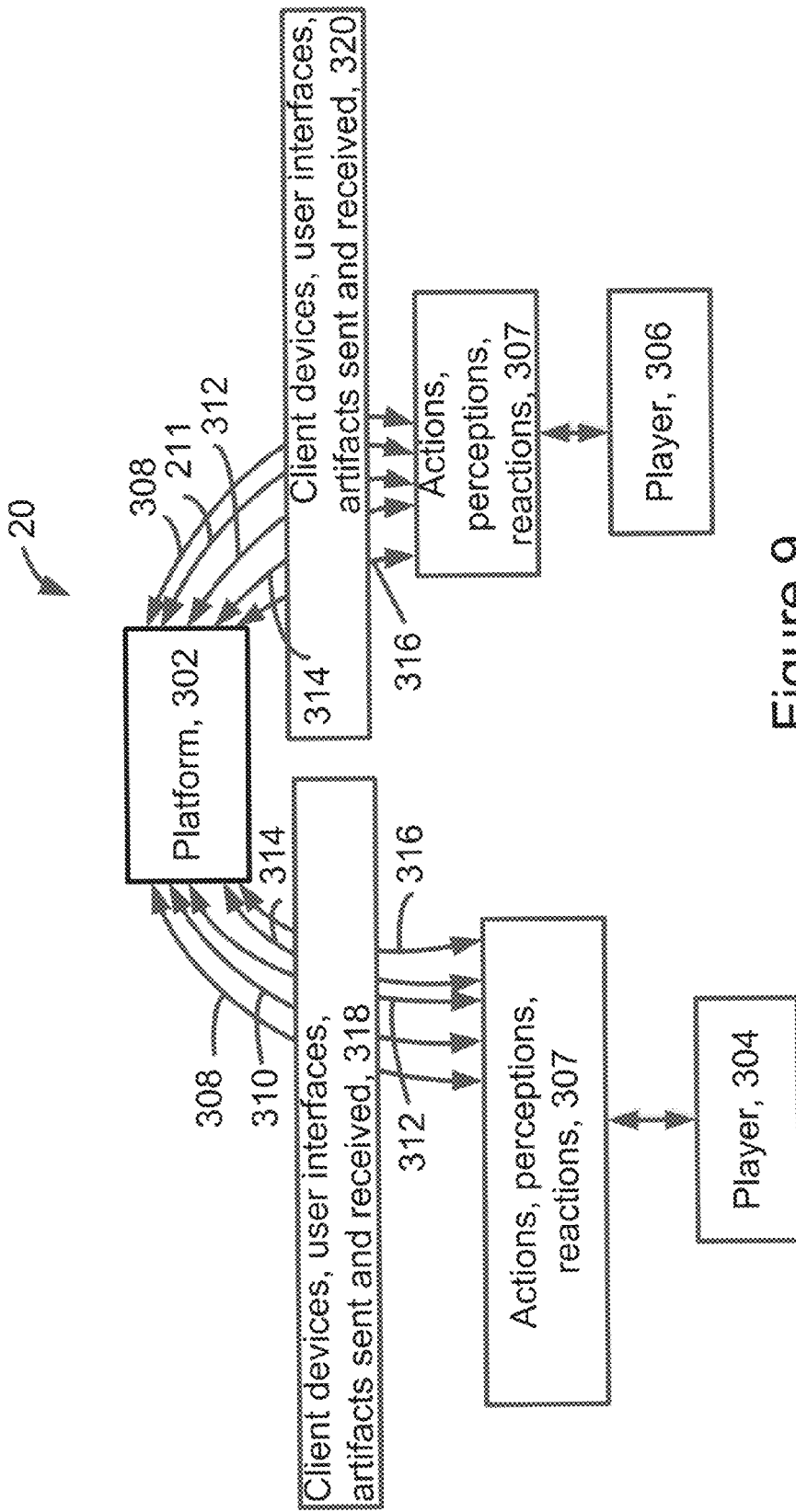
FIG. 9 is a block diagram of an example platform for the playing of games.

As shown in FIG. 9, technology 20 can provide a universal system or platform 302 that enables the playing of games by one or more players 304, 306, who can be at the same location or at different locations and can interact directly at a given location or indirectly through the platform or a combination of the two. The technology includes client devices, user interfaces, and artifacts sent and received, 318, 320, with respect to each of the players. Through the devices, interfaces, and artifacts, the platform can perform a number of operations with respect to the playing of the game. These include teaching 308 players about the game including its rules and rewards, operating as a participant in the game 310, keeping score or otherwise tracking activity and success in the game 312, providing rewards and other feedback 314, and reporting 316 to other players and to humans related to animals involved in the game on any aspect of the game. These activities can be effected in the form of actions, perceptions, and reactions 307, among other things.

We use the term activity broadly to include, for example, any conduct, performance, or action that engages the animal for a period of time. An activity may include a productive activity, such as arts and crafts, painting, or music, that yields a product or an outcome, for example. An activity could also involve a theoretically unproductive activity, such as sleeping. Activities can also include, in the broadest sense, the training, games, and entertainment that we describe elsewhere.

Figure 10:
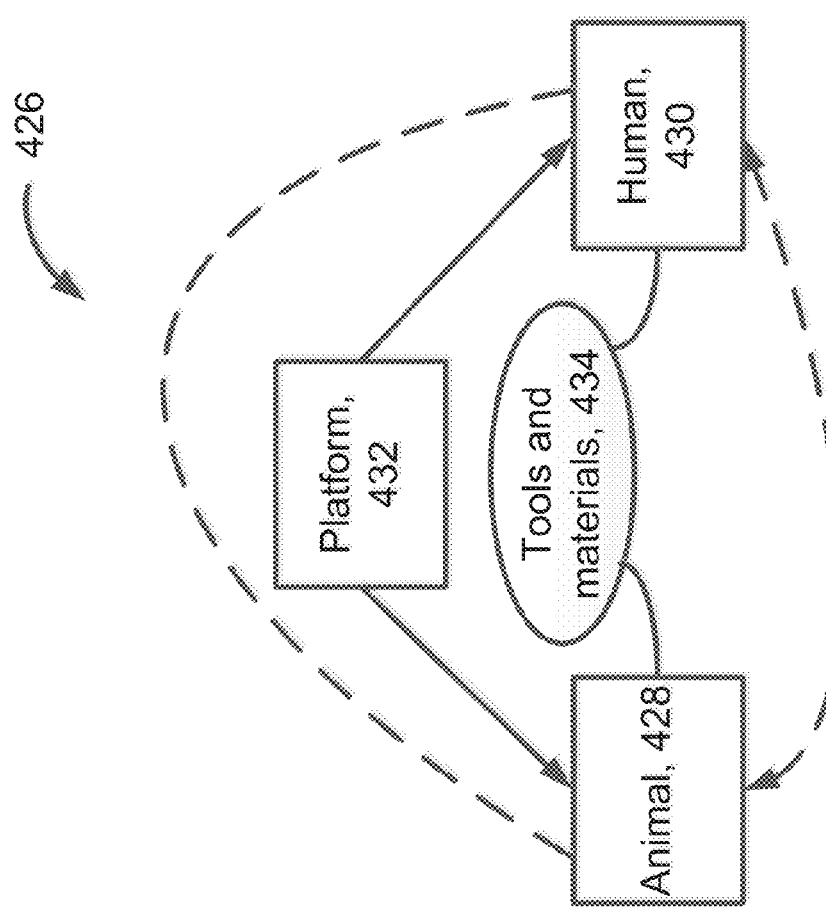
FIG. 10 is a block diagram of an activity including arts and crafts or music.

As shown in FIG. 10, in the case of a productive activity of the kind that involves arts and crafts or music 426, the activity can be engaged in by one or more animals 428 with or without the participation of one or more humans 430. One or more of the animals in one or more of the humans may all be located at the same place or they may be located at different places and cooperate through the platform 432. Tools and materials 434 can be provided at one or more of the locations. The platform can provide a variety of features with respect to arts and crafts activities, including teaching the animal or human about the game; releasing or activating tools or materials to be available to the animal for use in the activity; capturing audio, video, images, or graphics that result from the arts and crafts activity of the animal; providing rewards, praise, or other feedback to the animal; serving as an intermediary between the animal and other animals or humans with respect to the arts and crafts activity, and others. Functions, operations, and devices analogous to those shown in FIGS. 6 and 9 could be used in such activities.

Figure 11:
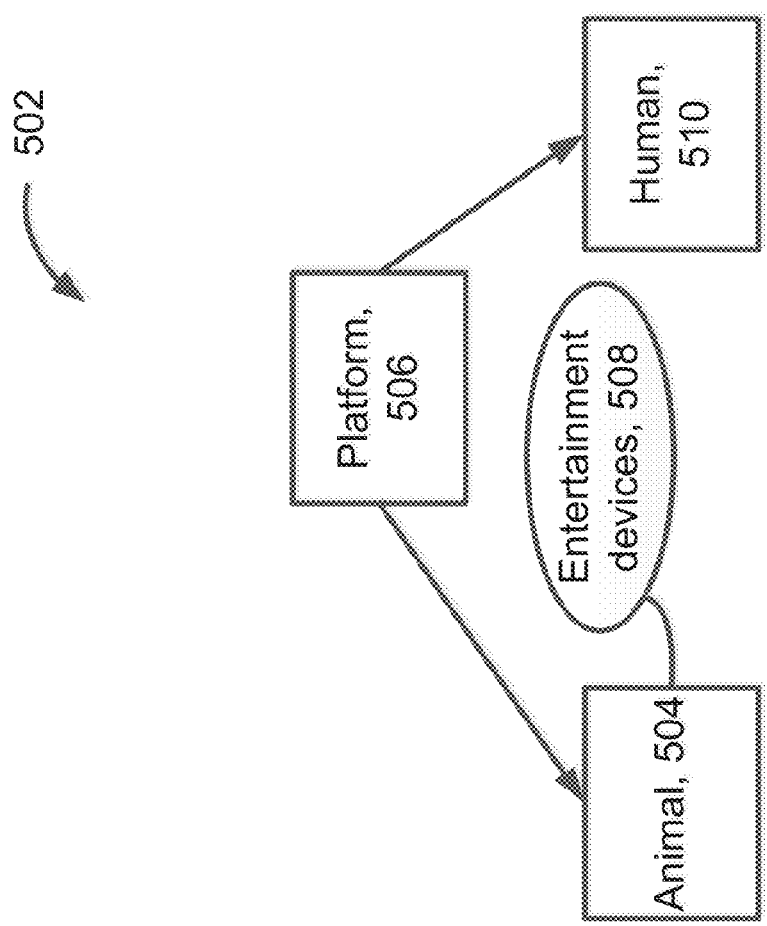
FIG. 11 is a block diagram of entertainment of an animal.

We use the term entertainment in its broadest ordinary sense. As shown in FIG. 11, entertainment 502 of an animal 504 can be facilitated by the platform 506 (using technology 20 in a mode analogous to the ones shown in FIGS. 6 and 9). In connection with the entertainment, the platform can notify the animal when the entertainment is available, determine whether the animal is available for the entertainment, capture audio, video, images, graphics, odors, and other artifacts while the animal is receiving the entertainment, report to one or more others animals or to one or more humans 510 about the entertainment or the animal's reaction to the entertainment, and a wide variety of other actions.

When the technology is used to teach, train, or otherwise cause the animal to learn, the subject matter of the teaching, training or learning can be any of a wide variety of subjects. The animal can be taught skills or knowledge or information or relationships, for example.

As an example, Fluffy could be taught vocabulary. It is believed that dogs are capable of learning vocabulary that includes as many as hundreds of "words" and concepts. The words can involve things, actions, and other kinds of vocabulary. Typical vocabulary words include come, sit, bring, stay, drink. Concepts could, among a wide variety, "Do you want to take a walk?", "Bring the ball.", "Do you want a treat?", "Do you want to watch TV?"

The technology could be used to teach vocabulary in a way that is useful and effective and can be applied even when the communicator who is training the animal is at a different location or when there is no human communicator engaged in the training. For example, the teaching of vocabulary and any other kind of teaching or training can be done by the technology itself without the participation of a human.

To teach Fluffy the meaning of the word "ball", the technology can present artifacts to Fluffy that could include the presentation of images of a ball or of many different kinds of balls through a television, a tablet computer display, a cell phone, or any other kind of client device. The artifacts could also include a real ball to which Fluffy is given access, for example, by opening an electrically controlled during the box that contains the ball. The artifact could also include the presentation of the word ball, and an audio or video recording of a human speaking the word ball, either alone or in the context of the sentence. The client device that is presenting the artifacts can be controlled by the servers to present the artifacts repeatedly in one or more sessions so that Fluffy comes to associate the spoken word ball or the written word ball or both of them with a ball.

The technology could acquire video or audio clips of Fluffy during the course of the training and provide the video or audio in real time to a human at a remote location or could store the clips for later use. This can allow a human trainer to determine whether Fluffy is responding in a way that indicates that Fluffy is learning to understand the meaning of the word ball. In some cases, the technology can analyze Fluffy's behavior and reaction to the training instances as a way to determine whether Fluffy is learning the meaning of the word ball.

The teaching of the word ball could involve a much more active participation of a human, such as Fluffy's owner, George. The artifacts presented to Fluffy could be presented in real-time from a remote location. George could release the door of the box containing the ball by tapping on a control presented on the screen of a handheld device. George could watch Fluffy's reaction in real-time from the remote location on a screen of the client device.

In some cases, Fluffy's reaction to the training may include barking or motions that Fluffy begins to use to represent his articulation of the word ball. The technology may analyze audio and video of the timing, volume, frequency, and other characteristics of the barking and the timing, speed, and trajectory of the motions in order to determine whether and if so what noises and motions Fluffy uses to express the word ball. Later, this information can be used to respond to Fluffy, for example, releasing the ball from the box when Fluffy barks in the way that means ball.

The training can also be of commands or instructions or directives or more generally sentences that include nouns and verbs. For example, George may want to teach Fluffy (or to have the technology teach Fluffy) the meaning of the command "find the ball". The training could be done by repeatedly following a sequence each iteration of which includes some or all of the following steps: the ball is placed or hidden at a location different from the location of a client device that Fluffy normally watches, for example, George may have placed the ball next to the washing machine in the laundry while the computer display that Fluffy often watches is in the dining room down the hall. George may have placed a number of balls in different location so that when he is away from the house, a series of iterations of the training exercise can be conducted. The training may be started automatically by the technology or manually by George taking some action on a client device at a remote location. For example, George may be on a business trip and when he wakes up in his hotel room he might pick up his cell phone, open the technology's app, and tap the button that says "train Fluffy" and then the button that says "find the ball".

When the training iteration is initiated, the technology uses a camera on a client device to watch for the presence of Fluffy. Once the technology determines that Fluffy is in front of the display, it can begin to present an artifact in the form of a real-time audio or video clip of George or someone else saying "find the ball, Fluffy". The technology can then determine if Fluffy has departed, presumably to hunt for the ball. The video can be presented in real-time to George in his hotel room or stored for later playback. If Fluffy finds one of the balls and brings it back to a place where the camera can capture Fluffy, the technology can use image recognition techniques to confirm that Fluffy has brought the ball back. The technology can automatically (or George can manually) then release the door of a box that contains a treat as a reward for Fluffy. The training exercise can be repeated many times, but typically would not be repeated too often in a single day in order not to provide Fluffy with too many treats.

An almost endless variety of things that the animal is capable of learning can be taught in this way including a wide variety of vocabulary nouns, adjectives, adverbs, verbs, expressions, concepts, and sentences.

An animal also can be taught lessons about its life as an animal. These lessons could include lessons about dangers, risks, pleasures, relationships, development, aging, death, health, grooming, sex, the environment, time and the passage of time, emotions, and a wide range of other matters of the kind that relate to living as an animal.

In some cases, for example, the animal can be taught about hazards such as being followed or attacked or bitten by a larger animal or a predator, the risks of man-made devices such as cars in streets, doors that have been unintentionally left open and therefore can allow the animal to run away, and others. In each of these cases, the training can be done by presenting artifacts to the animal that illustrate the hazard in a way that would be recognizable are understandable by the animal.

For example, if George wanted to teach Fluffy not to run out into the street when a car is coming, George could have the technology presents video and audio examples that show dogs like Fluffy or even spliced-in images and noises of Fluffy himself running into a street, being hit by a car, and feeling injury. Cameras and microphones can capture the reaction Fluffy to the presentations to determine whether the lesson is being understood and learned.

In some cases when hazards have been taught, it would be possible for the technology to thereafter present a staged opportunity for the animal to put itself into the hazardous situation and the animal to be rewarded for avoiding it. For example, an electrically operated latch on the door could be opened by the technology to allow the door to swing partly open as a way to test Fluffy to see whether he will leave the house and be exposed to the risk that would involve. If Fluffy recognizes the hazard and refrain from leaving the house, a reward could be presented to Fluffy by opening the door of a box containing a treat.

It is known that deaf dogs can learn sign language. The technology offers a platform for training a deaf dog in understanding sign language. Artifacts that can be used in this training could include videos of human beings making the signs associated with vocabulary, concepts, emotions, sentences, and other meanings. The artifacts could also include videos, audio, images, and other artifacts that represent the concept or meaning that is being signed. For example, suppose that Fluffy has a deaf sister, Puffy, owned by Zelda. Suppose Zelda wants to teach puffy to understand sign language for "ball". Zelda could prerecord video clips showing herself making the sign for ball. The clip could then be used as one of the artifacts presented to Puffy each morning after Zelda goes to school as part of the sign language training. In some cases, the technology could use signed language videos created by models rather than by pet owners themselves.

Similar training could be done for blind animals with respect to spoken language. The artifacts could include live or recorded language spoken by owners of the animals or other humans. The artifacts would also include representations of the things or actions associated with the spoken language, representations that could be heard or otherwise understood by the animals. For example, suppose that Fluffy has a blind brother, Duffy owned by Igor. If Igor wanted to train Duffy to understand the word ball, Igor could have the technology repeatedly play the spoken word ball for Duffy while releasing a ball from the electrically controlled box.

In many cases, the training will work better when the artifacts include audio and video clips from the animal's owner and audio and video clips of objects and actions and environmental conditions that are familiar to the animal.

Turning to games now, the technology can enable a wide variety of games to be played by the animal itself, the animal with other animals, the animal with one or more humans, and multiple animals with one or more humans.

A simple example could be a game in which Fluffy raises one of its paws and touches an object that contains a sensor that is part of one of the client devices. At first, Fluffy would be taught how to play the game, for example, by rewarding him when he successfully touches the object. Assuming that Fluffy thinks this is a fun game, in the future Fluffy could play the game without requiring a reward other than perhaps the ringing of a bell or some ephemeral award. To initiate the game, one or more artifacts would be presented to Fluffy (video, audio, images) that Fluffy would understand as an invitation to play the game. The technology would activate the sensor and condition it to be ready for Fluffy to touch. If Fluffy wanted to play the game, he could simply begin by touching his paw to the sensor and the ephemeral rewards such as a bell ringing would be the result. Fluffy could continue to do this repeatedly until he got tired of the game. The technology could determine that he had gotten tired by observing that he had left the room or had stopped playing the game. Video of Fluffy playing the game can be captured and streamed in real-time to remote location where George is playing golf, or can be stored for later use.

The broad range of games that could be handled by the technology include games that involve objects such as balls, targets, game boards, playing fields, rewards, scoring, teams, and a wide variety of other features. For example, another game could be, in effect, "kick the ball when it comes by." Some games can involve play between two animals, for example, Fluffy and Puffy, located at two different locations and played by each of them interacting with client devices at its own location. For example, the game could involve playing with two identical balls, one at each location. Each dog could see the other playing with its ball and the play could proceed according to rules that involve both of the dogs in both of the balls.

In some cases, animals such as dogs could be provided with a platform similar to Facebook that enables dogs to become friends and to keep up with the activities of one another. Postings on behalf of each dog could be done automatically by the technology using video, audio, images, and other communications that capture activities of the dog, "speech" of the dog, and other information known to the technology. Each of the dogs could enjoy watching the postings of other dogs, including its "friends" and stranger dogs. In some cases, the dog may be taught to provide its own postings, and to "like" and otherwise reactive the postings of other dogs. In some cases, an owner or other human associated with the dog could do the postings and interpret them for a dog.

Returning again to the use of the technology to host activities of animals, consider the following examples.

Arts and crafts activities for the animals can be organized and promoted by the technology using features and techniques of the kind discussed earlier. In one example, Fluffy could be taught to paint using real paint on a real canvas laid on the ground. Demonstrations of how to do this could be presented for the technology and client devices and feedback and rewards can also be provided to Fluffy. A very large canvas could be provided for this purpose by George or another human being. A wide range of lessons and trainings could be provided to increase the skill of Fluffy in painting. In some examples, electronically sensitive surfaces could be used in association with displays (either separate from the sensitive surfaces or layered below them) to enable Fluffy to paint electronically. To paint, Fluffy could walk on the sensitive surface or touch it in various places or lick it to indicate where color is to be placed on the drawing. All of the steps in this activity could be observed by George at a remote location or locally.

Other artistic activities could be taught to and engaged in by animals. For example, Fluffy could be taught to perform a kind of music. In some implementations, Fluffy could make noises, bark, engage in motions, and otherwise communicate with one of the client devices to indicate sequences of sounds that Fluffy intend to be part of the music he is creating. The technology could interpret each of the sounds, motions, and other communications, either individually or in combinations as representing sounds of selected pitches, volumes, and tonality. The technology could play it's interpreted sounds back to Fluffy or George or another animal or another human. Fluffy could learn which of his communications is being interpreted as which sound and in that way become more active and effective in creating music. The same approach could be used with multiple animals. For example, Fluffy and Puffy and Duffy could together make music either from a single location, or from multiple locations.

Yet another activity that could be supervised by the technology would be exercise routines. In order to keep Fluffy in good shape, George could ask the technology to supervise Fluffy's exercise regimes. For example, Fluffy could be taught to run on a treadmill by using the training techniques discussed earlier, and Fluffy's attention to engaging in the intended exercise could be monitored by client devices, tracked, and reported to George, and to Fluffy for that matter. An endless variety of exercises could be taught, manage, and tracked in this way. Groups of animals could be managed in a common exercise program.

The activities hosted by the technology could also include e-mail communication from and to an animal. The technology would receive artifacts from the animal through the client devices, interpret them as communications, and use an e-mail server to formulate and send an e-mail based on the artifacts. The e-mail can be sent always to a predetermined human being, such as the owner of a pet. In some cases, for example, Fluffy could be taught how to address his e-mail to one of his animal friends or to a human. Conversely for e-mail received by Fluffy from the e-mail server, the text and images of the e-mail can be interpreted or used directly to convey the content of the e-mail to Fluffy and indicate who originated the e-mail.

A virtually endless range of activities are possible. An animal could be taught to write prose. Or create a presentation. Or read prose. Or grasp the meaning of a presentation.

Animals can also be treated for ailments and have medicines prescribed through the medium of the technology. For example, Fluffy could be provided with physical therapy using the techniques described earlier following an accident. If artifacts of Fluffy detected by and analyzed by the technology indicate that Fluffy is hyperactive or upset about something, the technology could alert Fluffy's veterinarian. The artifacts could be presented to the veterinarian with a request for a prescription for Prozac. The veterinarian could write a prescription and have the medicine delivered to George's house for Fluffy. In some cases, manufacturers of pharmaceuticals and other treatments for animals could pay for advertising their products either directly to animals through the technology, or to humans associated with the animals. For example, a distributor of Prozac could be told that Fluffy is hyperactive and his owner is George. The distributor can then advertise Prozac for Fluffy directly to George.

In some implementations, a wide variety of the kinds of features that we have discussed here, and others, can be used in conjunction with broadcast and cable presentations of video and other content to animals, such as channels devoted to showing content to pets. Such content is typically presented passively to the animal. The features that we have discussed here, and others, can provide a sample or very rich interactive component that supplements or enhances the content being presented. An example of a technology that would enable more active interaction with an animal either separately or in conjunction with other sources of content being presented to the animal is the TV dongle available from Google, called Chromecast. The dongle can be attached to a video input port of a television, e.g., the HDMI port. The dongle then can connect wirelessly through a local Wi-Fi network to the Internet. Local other devices, such as mobile telephones and other mobile devices, can interact with the dongle through the Wi-Fi network. In addition, a remote device, such as a mobile phone of an owner of a pet who is located in a different place, can communicate through the Internet to the dongle.

An example of how this might be used is that when a dog is watching a channel devoted to showing content to pets, a camera in the room can capture the behavior of the dog. As discussed earlier, the video can be streamed to the dog owner's mobile device in another location. As the owner watches the dog watching a channel devoted to showing content to pets, the owner can decide to interact with the dog. For example, the owner can then stream his voice or locally captured video of him, through the mobile phone and then through the dongle to cause the video or voice to be played to the dog, for example, as an interruption to the a channel devoted to showing content to pets. In some cases, it may be possible to provide a second smaller window within the large TV frame to show the video of the owner to the dog at the same time when the dog is watching a channel devoted to showing content to pets. The interaction can include commands given by the owner to the dog, gameplaying between the owner and the dog, and a very wide variety of other activities.

Using the technology and platforms that we have described, a wide variety of interactions among animals and between animals and humans is possible. Among other things, the technology and platforms enable much richer, continuous, intense, pleasant, and productive relationships to be established, developed, and grown between individual humans and animals with which they are associated. In some examples, the technology and platforms can give great pleasure to the owner of the pet, and to the pet and can significantly improve the knowledge, behavior, and happiness of the animal and the human.

Throughout our discussion, although we have referred to communications based on the English language, of course, any language could be the medium of communication, including signed language for the deaf.

Although we provide some specific examples in our discussion, the concepts that underlie the examples can be applied to a wide variety of other implementations. For example, the animals need not be dogs or cats or even pets. Any animal capable of some level of communication could be involved. The human and animal need not be in different locations and need not be unable to see or hear each other in some implementations. They can be in the same place and able to see or hear each other and still be benefited by assisted communication of the kind that we describe. In some applications, the assisted communication can be between one animal and another animal without a human involved.

In each of these applications of the platform, a wide variety of data analytics, including the analysis and analyzing discussed earlier, can be used in facilitating, operating, and using the games, activities, entertainment, training, or teaching. Data analytics can be used to analyze data related to artifacts acquired from animals and humans and information about populations of animals and humans, and information available on the Internet or from databases about the behavior of individual humans and animals or groups of them that may bear on the game, activities, entertainment, training, or teaching.

Figure 12:
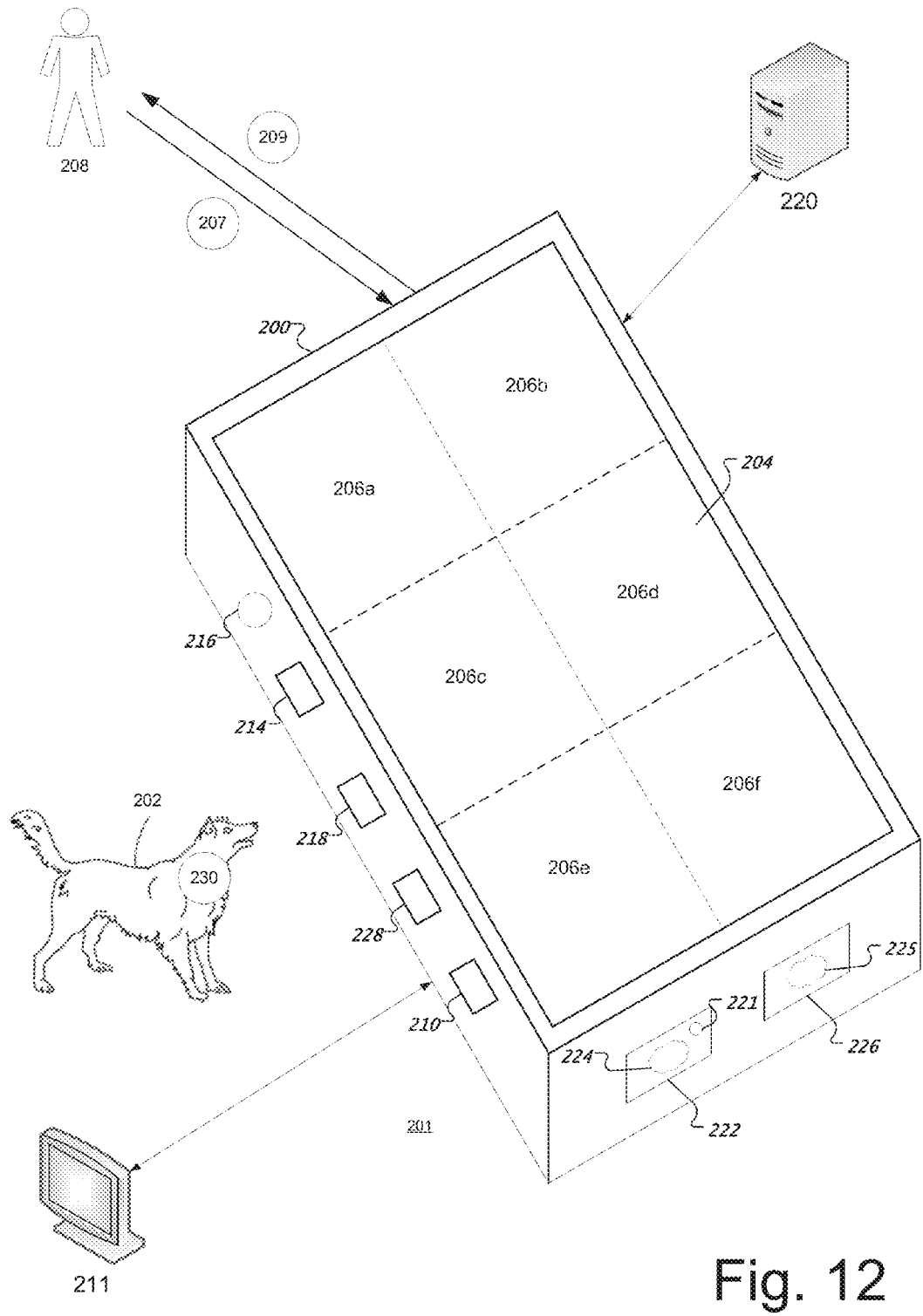
FIG. 12 is a schematic diagram of an example activity center.

Referring to FIG. 12, an activity center 200 provides an animal 202 (e.g., Fluffy) with access to one or more types of activities. The activity center 200 can be an electronic device, such as a large-size tablet that displays or otherwise presents content, such as images, video, audio, or other content on a display 204. For instance, a lateral dimension (e.g., a length or width) of the activity center 200 can be at least about 12 inches, e.g., at least about 24 inches, at least about 36 inches, at least about 48 inches, or another size. The display 204 can be display having a touch sensitive surface. By a touch sensitive surface, we mean an electronic surface whose operation can be controlled by touch. In some examples, the activity center 200 can be placed on the floor 201 such that Fluffy 202 can walk, run, or stand on the activity center 200 and can watch the content that is displayed or both at the same time, thus interacting with the touch-sensitive display. In some examples, Fluffy 202 can select the type of content that is displayed on the activity center by interacting with the touch-sensitive display, e.g., by interacting with a particular section of the display in order to activate a certain type of content, as discussed below. The activity center 200 can keep Fluffy 202 occupied and stimulated while its owner 208 (e.g., George) is unavailable or out of the house.

Figure 13:
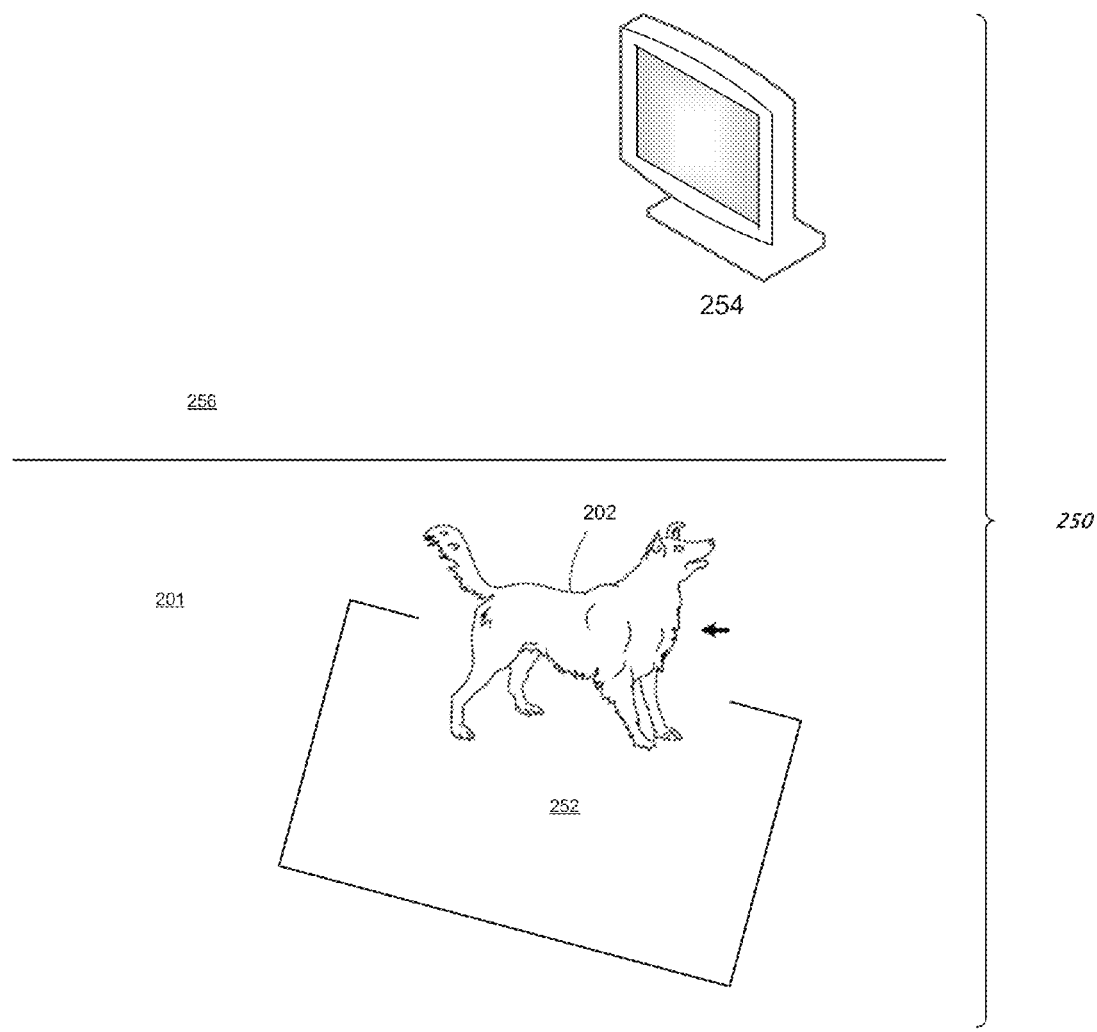
FIG. 13 is a schematic diagram of an example activity center.

In some examples, e.g., as shown in FIG. 13, an activity center 250 includes a touch sensitive horizontal surface 252 that Fluffy can walk, run, or stand on that can be placed on the floor 201. The activity center 250 also includes a display 254 that is separate from the touch sensitive surface. For instance, the display 254 can be positioned vertically (e.g., hung on a wall 256 or standing on a table) and near, such as adjacent, to the touch-sensitive surface 252. The display 254 can be, e.g., a computer monitor, a television, or another type of display. In the following description, we refer to features of the activity center 200, but these features can also apply to the activity center 250 or to other arrangements of an activity center.

The activity center 200 can include electronics and communication capabilities to send messages or other information 209 to George 208 representative of artifacts of communication from Fluffy, such as recordings of Fluffy's barking or other noises, still images, audio, or video images of Fluffy interacting with the activity center, artwork created by Fluffy, or other artifacts of communication, as described in greater detail below. For instance, Fluffy's noises can be received by a microphone 216. Images can be captured by one or more cameras (e.g., cameras 300, 306 shown in FIG. 15). The activity center 200 can also receive messages and other information or commands 207 from George 208 representative of artifacts of communication from George to Fluffy, such as still images, audio, or video images of George, instructions to the activity center about actions to be taken, content to be captured, or content to be presented. The activity center can include speakers 214 to play sounds.

The activity center 200 can incorporate one or more communications devices 210 to enable the activity center 200 to receive content and other information and commands, transmit content and other information, or both. In some examples, the communications devices 210 can include devices that enable the activity center 200 to connect to, e.g., the Internet (through a wired or wireless connection), a cellular telephone network, or another type of communications network. For instance, the communications devices 210 can enable the messages (we sometimes use the term messages broadly to include, for example, messages, instructions, commands, or other information) 207, 209 to be sent to or from George or Fluffy. In some examples, the communications devices 210 can include devices that enable the activity center 200 to receive radio signals, broadcast or cable television signals, streaming video or music (e.g., from Netflix™, Pandora™, or other sources of streaming video or music), or other types of video or audio signals. For instance, the communications devices 210 can include a Chromecast™ device or another type of streaming device. In some examples, the communications devices 210 can include devices that enable the activity center 200 to communicate with a client device 211, such as a computer, laptop, pad computer, mobile device, mobile telephone, telephone, television, music system, appropriately wired refrigerator, storage container, door or gate, pet house, house, automobile, boat, kennel, or and veterinary facility to name a few. For instance, the communications devices 210 can include Bluetooth™-enabled devices.

The display 204 can be arranged in one or more sections, each section or groups of sections providing a different activity for Fluffy 202. In the example of FIG. 12, the display 204 is divided into six sections 206a-206f (which we sometimes refer to collectively as sections 206); however, the display 204 can be divided into more or fewer sections or groups of sections. The activities accessible to Fluffy 202 through the sections 206 of the display 204 can include, e.g., animal television, animal social media, owner resources, arts activities, music activities, play, training, or other activities, or a combination of any two or more of them. In the example of FIG. 12, section 206a provides animal television, section 206b provides animal social media, section 206c provides owner resources, section 206d provides arts and crafts activities, section 206e provides music, and section 206f provides play. Each section 206 can be activated by a selection, e.g., a touch on the section, e.g., by Fluffy or George. For instance, Fluffy 202 can activate a particular section 206 of the display 204 by touching the section 206, e.g., by stepping or walking on the section 206 (e.g., anywhere on the section 206 or on a particular part of the section 206), tapping her paw on the section 206, scratching the section 206, licking the section 206, or touching the section 206 in another way, or a combination of any two or more of them. For instance, if Fluffy 202 wants to watch television, she can walk onto section 206a; if Fluffy 202 wants to create a work of art, she can walk onto section 206d. In some examples, Fluffy 202 can activate a particular section 206 by interacting with another device, such as by pushing a button remote from the activity center 200, interacting with another computing device, or in another way. In some examples, George can remotely control which section 206 of the display 204 is activated, e.g., by sending a message to the activity center 200, by accessing a user interface on another device (e.g., a personal computer or a mobile computing device), by remotely accessing a control interface of the activity center 200 using another device (e.g., a personal computer or a mobile computing device) that communicates with the activity center 200, or in another way.

In some examples, the number of sections 206 is set by default, e.g., by the software of the activity center 200. The sections can be square or rectangular but need not be square or rectangular and can be other shapes. In some examples, a single, large display 204 is arranged electronically into sections 206, with each section corresponding to a region of the display 204. In some examples, the activity center can be assembled from multiple, smaller displays, each of which corresponds to a section 206. The particular section 206 in which each activity is located can be fixed so that Fluffy 202 can learn which section of the display 204 to touch in order to activate a desired activity. In some examples, George 208 can specify the number of sections 206, the activity provided by each section, or both, e.g., by selecting one or more of the activities offered by activity center 200 to which George 208 wants Fluffy 202 to have access. In some examples, George can specify a time of day at which a particular activity can be provided. For instance, George may want Fluffy to have access only to active activities, such as arts and crafts, music, play, or training, in the morning, and may want Fluffy to have access to more passive activities, such as animal television or animal social media, in the afternoon. George can specify activities to activate in real time or can specify a schedule of activities, e.g., by sending a message to the activity center 200, by accessing a user interface on another device, by remotely accessing a control interface of the activity center 200 using another device, or in another way.

When Fluffy 202 steps on or otherwise selects section 206a (in this example), animal television is turned on. Animal television can be a broadcast or cable television channel or streaming content that includes content that is geared toward animals, such as television programming for dogs. In some examples, the programming is displayed directed on the display 204. In some examples, Fluffy's selection of section 206a causes the activity center 200 to send a command to a television 212 or another display device such that the programming can be displayed on the television 212 or other display device.

When Fluffy 202 steps on or otherwise selects section 206b (in this example), animal social media is activated. Animal social media can include video, images, or sounds of Fluffy, Fluffy's friends (e.g., other animals Fluffy may recognize, such as a neighbor's dog), George, other people Fluffy may recognize (e.g., other family members or neighbors), Fluffy's favorite places, or other content, or a combination of any two or more of them. In some examples, the social media content is displayed directed on the display 204. In some examples, Fluffy's selection of section 206a causes the activity center 200 to send a command to the television 212 or another display device such that the social media content can be displayed on the television 212 or other display device.

When Fluffy 202 steps on or otherwise selects section 206c (in this example), owner resources are activated. Owner resources can include content geared toward an animal owner, such as radio or television programming geared toward an animal owner, training tips, notifications of local special events, coupons, advertisements for animal supply stores, information about medications or veterinarians, or other content geared toward an animal owner, or a combination of any two or more of them. In some examples, the owner resources are displayed directly on the display 204. In some examples, Fluffy's selection of section 206a causes the activity center 200 to send a command to the television 212 or another display device such that the owner resources can be displayed on the television 212 or other display device. In some examples, the owner resources displayed in section 206c can be related to content that Fluffy is or has interacted with on the display 204. For instance, if Fluffy repeatedly watched a video of a dog bone earlier in the day, an advertisement for dog bones can be displayed to George when the owner resources section 206c is activated.

When Fluffy 202 steps on or otherwise selects section 206d (in this example), arts and crafts activities, such as electronic painting, are activated. For instance, to paint, Fluffy could walk on, pat, lick, scratch, or otherwise touch the display 204 to create an electronic painting. In some examples, Fluffy's painting can be formed based on the locations of Fluffy's touch such that the painting is a trail of where Fluffy walked, patted, licked, scratched, or otherwise touched the display. In some examples, the painting can also reflect pressure (e.g., how hard Fluffy touched the display), type of motion (e.g., whether the touch was a walk, pat, lick, scratch, or another type of touch), speed (e.g., whether Fluffy was sluggish or moving quickly), or other information about Fluffy's interaction with the display 204. For instance, pressure, type of motion, speed, or other information can be reflected in colors (e.g., shade or brightness of color, e.g., greater pressure can be depicted as a brighter color, each type of motion can be depicted as a different color), dimensionality (e.g., a three-dimensional representation of Fluffy's painting can reflect pressure in the height of the three-dimensional features), or in another way. Fluffy's painting can be a single color or multicolored. The colors of Fluffy's painting can be randomly assigned, assigned by position within the art activity section 206d, assigned based on Fluffy's interaction with the display 204 as discussed above, other assigned in another way. In some examples, Fluffy can paint on the display 204 and the painting can be displayed elsewhere, such as on another local computing device, the television, or George's personal computer, or on another display.

The activity center 200 can save Fluffy's work of art to a local memory 218 or a remote storage 220 (e.g., George's personal computer, cloud-based storage, or another type of remote storage). For instance, the activity center 200 can save Fluffy's work of art after Fluffy has worked on the art activity for a certain amount of time (e.g., 2 minutes, 5 minutes, 10 minutes, or another amount of time), after the section 206d is a certain percentage filled with Fluffy's painting (e.g., 50%, 60%, 70%, 80%, 90%, or 100%, or another amount), or based on one or more other criteria. The activity center 200 can send George a digital representation of Fluffy's work of art, such as a picture file, or a link to the digital representation, such as a link to a public or private remote storage. For instance, the activity center 200 can send a message (e.g., an email message, a short message service (SMS) message, a voice mail message, a social network message, or another type of message) to George with the digital representation or the link.

When Fluffy 202 steps on or otherwise selects section 206e (in this example), music activities are activated. The music activities can enable Fluffy to perform a kind of music. For instance, Fluffy could make noises, bark, or make other sounds that are received by the microphone 216. In some examples, the activity center can interpret each of Fluffy's sounds, either individually or in combinations as representing sounds of selected pitches, volumes, and tonality, as described above, to create music. In some examples, Fluffy's actual sounds (e.g., barking, growling, or other dog sounds) can be superimposed over a pre-recorded song. The pre-recorded song can be selected randomly, selected based on the time of day (e.g., a high-energy song in the morning, a soothing song in the evening), selected based on Fluffy's mood as determined by her sounds or her level of interaction with the activity center 200 or both, or selected based on another criteria. Other sounds can also be superimposed over the pre-recorded song along with Fluffy's sounds, such as George's voice, sounds from other animals (e.g., Fluffy's friends), ambient noise that Fluffy may recognize, or other sounds.

In some examples, Fluffy's "music" can be played back automatically or according to an action by Fluffy, such as when Fluffy walks on a certain part of the display 204 or when Fluffy does a certain type of interaction with the display 204, such as a lick, tap, scratch, or other type of interaction. Fluffy's sounds, the pre-recorded song, or other sounds can be played by the speakers 214 of the activity center 200 or by speakers of another device, such as another local computing device, the television, or George's personal computer, or by speakers of another device.

The activity center 200 can save Fluffy's work of music to local memory 218 or to remote storage 220. For instance, the activity center 200 can save Fluffy's work of music after Fluffy has worked on the music activity for a certain amount of time (e.g., 2 minutes, 5 minutes, 10 minutes, or another amount of time) or based on one or more other criteria. The activity center 200 can send George a digital representation of Fluffy's work of music, such as an audio file, or a link to the digital representation, such as a link to a public or private remote storage. For instance, the activity center 200 can send a message (e.g., an email message, a short message service (SMS) message, a voice mail message, a social network message, or another type of message) to George with the digital representation or the link.

When Fluffy 202 steps on or otherwise selects section 206f (in this example), play activities are activated. Play activities can include, e.g., the games described above. Training activities (which are not provided by a section in this example) can include, e.g., the training activities described above, such as teaching vocabulary, life lessons, or other training topics.

Other activities not described here can also be provided by one or more of the sections 206 of the activity center 200.

In some examples, one or more activities can be provided by default when Fluffy is not actively interacting with the activity center 200. For instance, when Fluffy has not touched the activity center 200 for more than a certain amount of time (e.g., 5 minutes, 10 minutes, 15 minutes, or another amount of time), one of the activities can be activated, such as the animal television activity, the animal social media activity, or another activity. When Fluffy next touches the activity center 200, the default activity is stopped and the activity selected by Fluffy is activated.

In some examples, the activity center 200 can include a treat door 222 that can be opened to give Fluffy 202 access to a treat 224 stored behind the treat door 222 (e.g., in a hollow within the activity center 200). For instance, an electronically operated latch 221 on the treat door 222 can be activated to open the treat door 222, allowing Fluffy to access the treat 224. In some examples, George can send a command to the activity center 200 to open the treat door 222, e.g., if he watches Fluffy do something good, if he likes the artwork or music created by Fluffy, or for another reason. In some examples, the activity center 200 can determine whether to open the treat door 222, e.g., based on Fluffy's performance during an activity. For instance, the activity center 200 may be programmed to open the treat door 222 if Fluffy focuses on a single activity for a certain amount of time (e.g., 5 minutes, 10 minutes, 15 minutes, or another time), if Fluffy performs well on the training activity, or for another reason.

In some examples, the activity center 200 can have a scent box 226 inside of which (e.g., in a hollow within the activity center) a scented artifact 225, such as a device or mechanism capable of emitting an odor in response to a command, can be placed. (See for example the discussion at http://en.wikipedia.org/wiki/Digital_scent_technology.) The scented artifact can be activated to emit its odor to alert Fluffy that the activity center 200 is turned on, that a particular activity is active (e.g., that the arts activity is active), that a particular time of day is approaching (e.g., that it is almost the end of the day and George will be home soon), or to alert Fluffy of another status. A different odor can be used for each alert. For instance, a chicken liver odor may alert Fluffy that the arts activity is active, a beef odor may alert Fluffy that it is lunch time, and the odor of fresh dirt may alert Fluffy that George will be home soon to take Fluffy for a walk. In some examples, the time at which a particular odor is emitted can be specified in advance, e.g., George can program the odor schedule before he leaves for work in the morning. In some examples, George can send a command to the activity center 200 to cause a particular odor to be emitted, e.g., if George is planning to come home early.

In some examples, the activity center 200 can have a health module 228 that can measure one or more parameters indicative of a physical status of Fluffy. For instance, the health module 228 can measure Fluffy's heart rate, weight, muscle density, or other parameters. In some examples, the health module 228 can receive data from a wearable monitor 230, such as a heart rate monitor, worn by Fluffy. The activity center 200 can use the parameters measured by the health module 228 to infer Fluffy's current activity level (e.g., whether Fluffy is active, calm, lethargic, or acting in another way), to track Fluffy's health over time, or both.

Figure 14A:
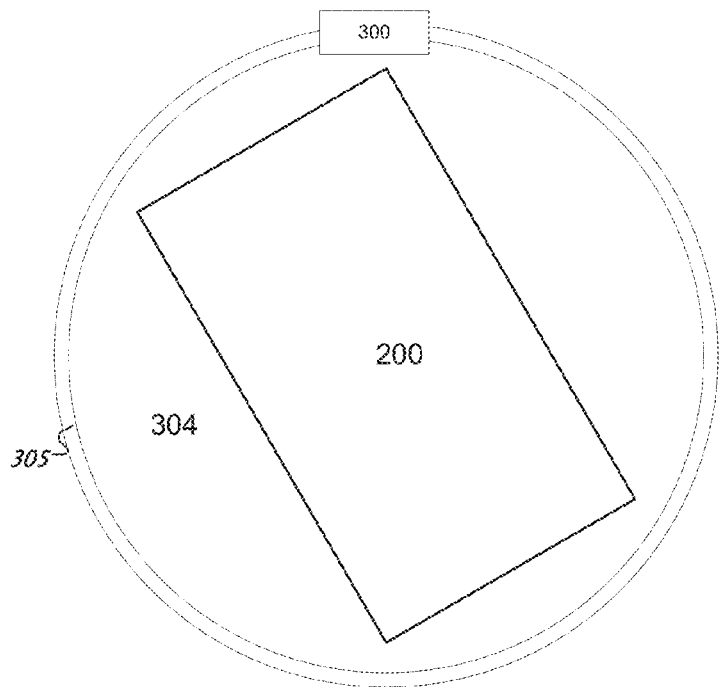
FIGS. 14A and 14B are a top view and a side view, respectively, of an example activity center.

Referring to FIG. 14A, as seen in a top view and a side view, respectively, of the activity center 200, in some examples, a camera assembly 300 is positioned near the activity center 200 to record Fluffy's interactions with the activity center 200. One or more still or video cameras 302 are mounted on the camera assembly. In the example shown, the camera assembly 300 includes three video cameras 302a, 302b, 302c mounted each at a different angle, however, more or fewer cameras can also be used. The camera assembly 300 can be movably mounted on a base 304 such that the camera assembly 300 can revolve around the activity center 200. For instance, the base can have a track 305 on which the camera assembly 300 is mounted such that the camera assembly 300 can travel around the circumference of the base 304.

Figure 14B:
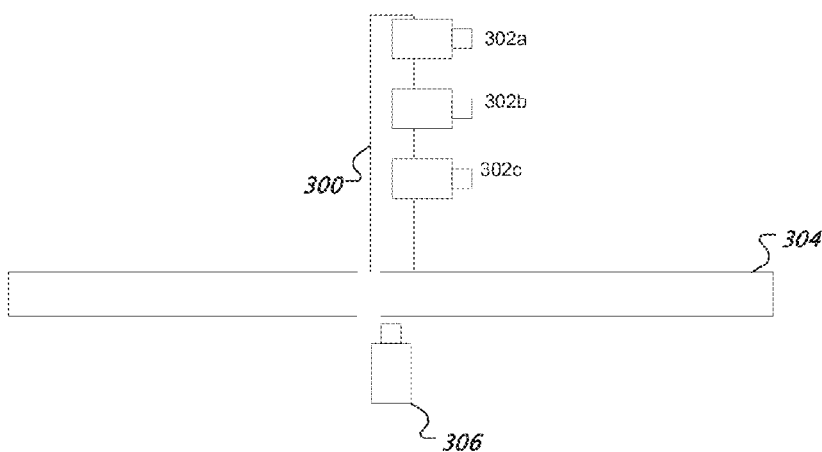

Referring also to FIG. 14B, as seen in a side view of the activity center 200, in some examples, the surface of the display 204 of the activity center 200 is transparent or translucent and a bottom camera 306 is positioned under the display 204 to take still or video images of Fluffy from below. Together, the cameras 302 mounted on the camera assembly and the bottom camera 306 provide four perspectives of Fluffy interacting with the activity center 200 and can be used to capture information that can be used to generate three-dimensional (3D) still or video images of Fluffy.

In some examples, video images of Fluffy interacting with the activity center 200 can be streamed to George in real time. For instance, when Fluffy interacts with the arts and crafts activity or the music activity, the activity center 200 can send a message to George to alert him that streaming video of Fluffy is available for viewing.

In some examples, Fluffy can wear a wearable camera, such as a GoPro® camera, that can acquire additional still or video images of Fluffy as she interacts with the activity center or as she goes about other activities. The wearable camera can record images, stream images, or both when Fluffy does something to activate the camera, such as when Fluffy starts interacting with a particular section of the activity center 200 (e.g., the arts and crafts activity or the music activity), when Fluffy barks or growls, when Fluffy's heart rate exceeds a threshold level, or based on one or more other criteria. In some examples, the wearable camera can cause a message to be sent to George when the camera is activated; in some examples, the wearable camera can alert the activity center 200 that it has been activated and the activity center 200 can send a message to George.

Figure 15:
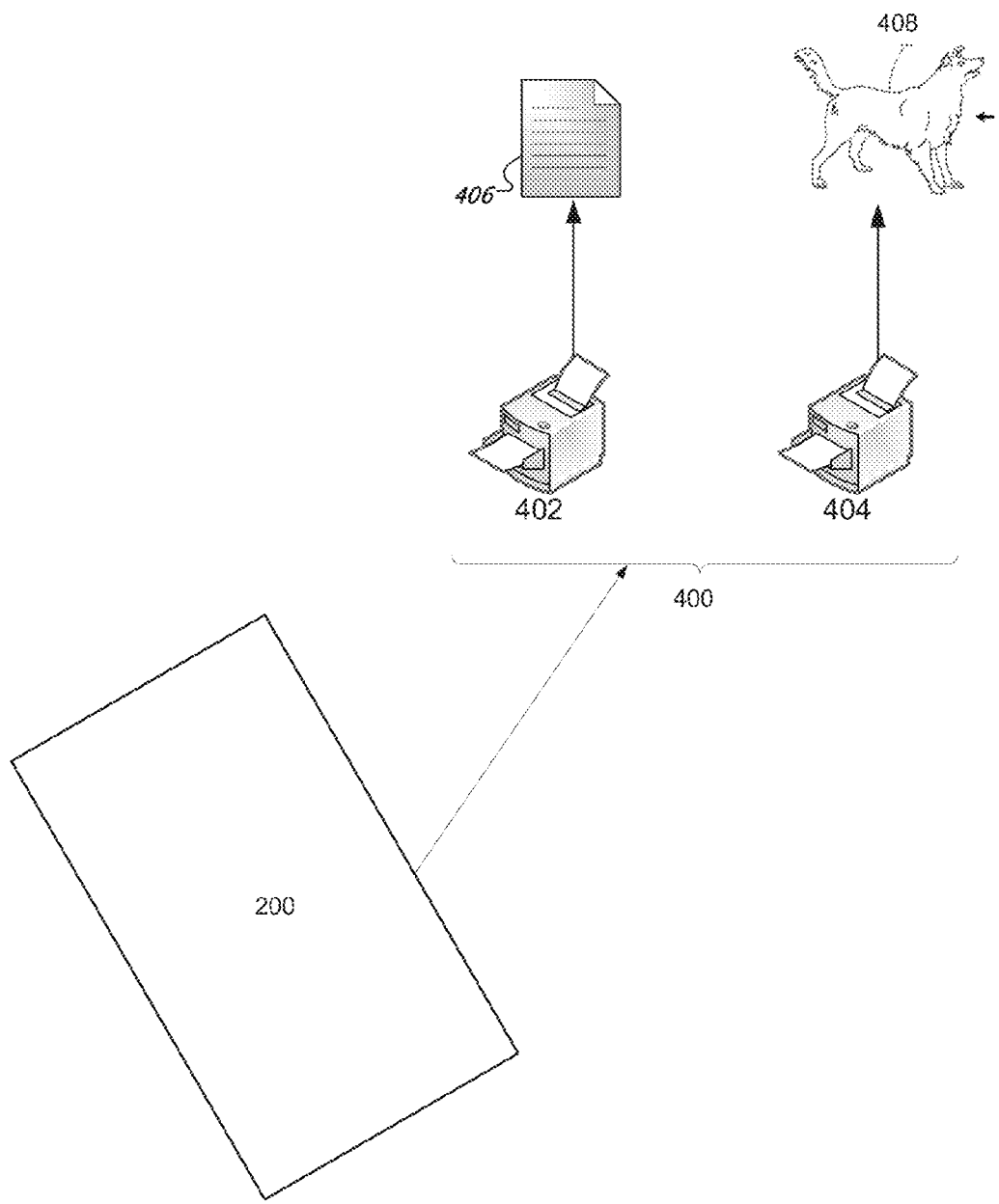
FIG. 15 is a schematic diagram of a printing system.

Referring to FIG. 15, in some examples, a printing system 400 can be used to print two-dimensional (2D) or 3D representations of Fluffy interacting with the activity center 200. The printing system 400 can include a 2D printer 402, such as an ink jet printer, a laser printer, a plotter, or another type of printer, a 3D printer 404, or both. The printing system 400 can be in wired or wireless communication with the activity center 200. Images acquired by one or more of the cameras 302, 306 can be sent to the printing system 400 for printing. The printing system 400 can also print a work of art created by Fluffy. For instance, the 2D printer 402 can print a 2D, color version 406 of a painting Fluffy created and the 3D printer 404 can print a 3D statue 408 of Fluffy creating the painting, thus creating a work of art that depicts Fluffy creating her own art.

In some examples, the activity center 200 activates the printing system 400 automatically. For instance, the activity center 200 can cause the printing system 400 to print a 2D color version of Fluffy's painting and a 3D statue of Fluffy creating that painting based on one or more criteria, such as after Fluffy has worked on the art activity for a certain amount of time (e.g., 2 minutes, 5 minutes, 10 minutes, or another amount of time), after the section 206d is a certain percentage filled with Fluffy's painting (e.g., 50%, 60%, 70%, 80%, 90%, or 100%, or another amount), or based on one or more other criteria. In some examples, the printing system 400 can be activated manually by George. For instance, when George receives a message including a work of art that he particularly likes or showing Fluffy in a particularly cute pose, he may send a command to activate the printing system 400.

Other implementations are within the scope of the following claims.

The invention claimed is:

1. A system comprising:
a touch-sensitive surface;
a camera mounted to be movable relative to the touch-sensitive surface to acquire an image of an animal interacting with the touch-sensitive surface;
a computing device including a processor coupled to a memory, the memory storing instruction that, when executed by the processor, cause the computing device to:
cause each of multiple sections of the touch-sensitive surface to be associated with a corresponding activity in which the animal can engage;
detect a selection of one of the multiple sections of the touch-sensitive surface, the selected section associated with a visual art activity; and
activate the visual art activity associated with the selected section of the touch surface, including storing data indicative of one or more interactions of the animal with the touch-sensitive surface.

2. The system of claim 1, in which the touch-sensitive surface comprises a display screen.

3. The system of claim 1, comprising a display for displaying content associated with the activity.

4. The system of claim 1, comprising a mount disposed around at least some of the touch-sensitive surface, the camera mounted on the mount.

5. The system of claim 1, in which the stored data are representative of an item of visual art created by the animal.

6. The system of claim 5, in which each interaction of the animal with the touch-sensitive surface is indicative of an element of the item of visual art.

7. The system of claim 1, in which storing data includes storing data indicative of a position of the animal on the touch-sensitive surface, a type of touch of the animal on the touch-sensitive surface, a pressure of the animal's touch on the touch-sensitive surface, or a combination of any two or more of them.

8. The system of claim 1, in which the activity comprises creating a work of music, the processor coupled to the memory being configured to record sounds generated by the animal.

9. The system of claim 8, in which the processor and memory are configured to combine the recorded sounds with a previously created audio file.

10. The system of claim 1, in which the processor and memory are configured to:
detect a selection of a second one of the multiple sections of the touch-sensitive surface; and
enable the activity associated with the second section of the touch-sensitive surface, the activity comprising watching a video or listening to audio.

11. The system of claim 1, in which the processor and memory are configured to:
detect a selection of a second one of the multiple sections of the touch-sensitive surface; and
enable the activity associated with the second section of the touch-sensitive surface, the activity comprising playing.

12. The system of claim 1, in which the processor and memory are configured to:
detect a selection of a second one of the multiple sections of the touch-sensitive surface; and
enable the activity associated with the second section of the touch-sensitive surface, the activity comprising training the animal.

13. The system of claim 1, in which the processor and memory are configured to:

detect a selection of a second one of the multiple sections of the touch-sensitive surface; and enable the activity associated with the second section of the touch-sensitive surface, the activity comprising an activity directed to a person associated with the animal.

14. The system of claim 1, in which the touch-sensitive surface is sized such that the animal can select one of the multiple sections by walking on the touch-sensitive surface.

15. The system of claim 1, comprising a bottom camera disposed below the touch-sensitive surface.

16. The system of claim 1, in which the processor and memory are configured to send, to a printer, data representative of an image of the animal interacting with the touch-sensitive surface, data representative of an image of an item of visual art created by the animal's interaction with the touch-sensitive surface, or both.

17. The system of claim 16, in which the processor and memory are configured to determine, based on the animal's interaction with the touch-sensitive surface, when to send the data to the printer.

18. The system of claim 17, in which the determination is made based on an amount of time the animal interacted with the touch-sensitive surface, a degree to which the animal completed the activity, or both.

19. The system of claim 16, in which the data comprise information sufficient to print a two-dimensional representation of the animal or the item of visual art.

20. The system of claim 16, in which the data comprise information sufficient to print a three-dimensional representation of the animal or the item of visual art.

21. The system of claim 1, in which the processor and memory are configured to send, to a computing device, data representative of an image of the animal interacting with the touch-sensitive surface, data representative of an image of an item of visual art created by the animal's interaction with the touch-sensitive surface, or both.

22. The system of claim 21, in which the processor and memory are configured to determine, based on the animal's interaction with the touch-sensitive surface, when to send the data to the computing device.

23. The system of claim 1, in which the processor and memory are configured to monitor a physical characteristic of the animal.

24. A method comprising:

cause each of multiple sections of a touch-sensitive surface to be associated with a corresponding activity of an animal;

detect a selection of one of the multiple sections of the touch-sensitive surface, the selected section associated with a visual art activity;

activate the visual art activity associated with the selected section of the touch-sensitive surface, including storing data indicative of one or more interactions of the animal with the touch-sensitive surface; and acquiring multiple images of the animal interacting with the touch-sensitive surface during the activated activity.

25. The method of claim 24, comprising displaying content associated with the activity on a display screen associated with the touch-sensitive surface.

26. The method of claim 25, in which the touch-sensitive surface comprises the display screen.

27. The method of claim 24, in which detecting a selection of the one of the multiple sections comprises detecting an interaction of the animal with the touch-sensitive surface.

28. The method of claim 24, comprising sending, to a printer, data representative of an image of the animal interacting with the touch-sensitive screen, data representative of an image of an item of visual art created by the animal during the activated activity, or both.

29. The method of claim 28, comprising determining when to send the data to the printer based on the animal's interaction with the touch-sensitive surface.

30. The method of claim 28, in which the data comprise information sufficient to print a three-dimensional representation of the animal or the item of visual art.

* * * * *